US010997734B2

(12) United States Patent
Asano

(10) Patent No.: US 10,997,734 B2
(45) Date of Patent: May 4, 2021

(54) GAS DETECTION-USE IMAGE PROCESSING DEVICE, GAS DETECTION-USE IMAGE PROCESSING METHOD, AND GAS DETECTION-USE IMAGE PROCESSING PROGRAM

(71) Applicant: KONICA MINOLTA, INC., Tokyo (JP)

(72) Inventor: Motohiro Asano, Osaka (JP)

(73) Assignee: KONICA MINOLTA, INC., Tokyo (JP)

( * ) Notice: Subject to any disclaimer, the term of this patent is extended or adjusted under 35 U.S.C. 154(b) by 73 days.

(21) Appl. No.: 16/466,181

(22) PCT Filed: Oct. 10, 2017

(86) PCT No.: PCT/JP2017/036580
§ 371 (c)(1),
(2) Date: Jun. 3, 2019

(87) PCT Pub. No.: WO2018/123197
PCT Pub. Date: Jul. 5, 2018

(65) Prior Publication Data
US 2019/0325587 A1    Oct. 24, 2019

(30) Foreign Application Priority Data

Dec. 27, 2016  (JP) .............................. JP2016-252270

(51) Int. Cl.
*G06K 9/00*  (2006.01)
*G06T 7/246*  (2017.01)
(Continued)

(52) U.S. Cl.
CPC ......... *G06T 7/248* (2017.01); *G01N 21/3504* (2013.01); *G06T 7/74* (2017.01); *G06T 2207/10048* (2013.01)

(58) Field of Classification Search
CPC ........ G01N 21/31; G01N 21/39; G01N 21/35; G01N 21/3504; G01N 33/00;
(Continued)

(56) References Cited

U.S. PATENT DOCUMENTS

| 6,822,742 B1 * | 11/2004 | Kalayeh | ................. G01N 21/39 356/437 |
| 2003/0025081 A1 * | 2/2003 | Edner | ................. G01N 21/3518 250/339.09 |

(Continued)

FOREIGN PATENT DOCUMENTS

| EP | 1257807 A1 * | 11/2002 | .............. G01M 3/38 |
| JP | 2012058093 A * | 3/2012 | |

(Continued)

OTHER PUBLICATIONS

International Search Report (and English translation thereof) dated Nov. 14, 2017 issued in International Application No. PCT/JP2017/036580.

(Continued)

*Primary Examiner* — Mahendra R Patel
(74) *Attorney, Agent, or Firm* — Holtz, Holtz & Volek PC

(57) ABSTRACT

A gas detection-use image processing device includes a processing part that performs first processing of acquiring a first image including a region image illustrating a region where a gas candidate has appeared, extracted from an infrared image, on each of a plurality of infrared images captured at a plurality of different times to acquire a plurality of first images. The gas detection-use image processing device also includes a decision part that decides similarity between two first images, in consideration of a movement of the region image in the two first images. The gas detection-use image processing device further includes a determination part that determines whether the gas candidate is a gas, (Continued)

based on the similarity decided by the decision part and whether the region image is moved.

21 Claims, 18 Drawing Sheets

(51) Int. Cl.
*G06T 7/73* (2017.01)
*G01N 21/3504* (2014.01)

(58) Field of Classification Search
CPC . G01N 2201/0221; G01N 2201/06113; G01N 2021/3155; G01N 2207/3531; G01N 2021/3531; G01N 2021/3509; G06T 7/248; G06T 7/74; G06T 2207/10048; G06T 7/20; G08B 21/14; G01J 5/00; H01L 27/146; G06K 9/40; G01M 3/38; G01M 3/02
USPC .......................................................... 382/103
See application file for complete search history.

(56) References Cited

U.S. PATENT DOCUMENTS

| | | | | |
|---|---|---|---|---|
| 2005/0156111 | A1* | 7/2005 | Racca .................... | G01M 3/38 250/338.5 |
| 2009/0200466 | A1* | 8/2009 | Mammen ................. | G06T 5/50 250/330 |
| 2013/0113939 | A1* | 5/2013 | Strandemar ...... | H04N 5/232933 348/164 |
| 2014/0002639 | A1* | 1/2014 | Cheben .................. | G08B 21/14 348/135 |
| 2015/0292975 | A1* | 10/2015 | Xu ..................... | G01N 21/3504 73/40.7 |
| 2015/0323449 | A1* | 11/2015 | Jones ................. | G01N 21/3103 356/437 |
| 2015/0369730 | A1* | 12/2015 | Schmidt .................. | G01S 17/89 250/208.1 |
| 2016/0320296 | A1* | 11/2016 | Asano .................... | G01J 5/0022 |
| 2018/0045567 | A1* | 2/2018 | Cabib ....................... | G01J 3/36 |
| 2018/0231460 | A1* | 8/2018 | Yanagi .................. | G01J 3/4338 |
| 2018/0321141 | A1* | 11/2018 | Tsuchiya ............... | G01M 3/38 |
| 2018/0364185 | A1* | 12/2018 | Asano .................... | G01N 25/72 |

FOREIGN PATENT DOCUMENTS

| | | | | |
|---|---|---|---|---|
| JP | 2012058093 | A | | 3/2012 |
| JP | 2012237563 | A | * | 12/2012 |
| JP | 2012237563 | A | | 12/2012 |
| JP | 2013143580 | A | * | 7/2013 ............... H04N 7/18 |
| JP | 2014198068 | A | * | 10/2014 .......... G06K 9/4604 |
| JP | 2016206139 | A | | 12/2016 |
| JP | 2019168225 | A | * | 10/2019 ............. G01N 21/49 |
| WO | WO-2017073430 | A1 | * | 5/2017 ......... G01N 21/3504 |
| WO | WO-2017104617 | A1 | * | 6/2017 ............ G01M 3/002 |

OTHER PUBLICATIONS

Written Opinion of the International Search Authority dated Nov. 14, 2017 issued in International Application No. PCT/JP2017/036580.

* cited by examiner

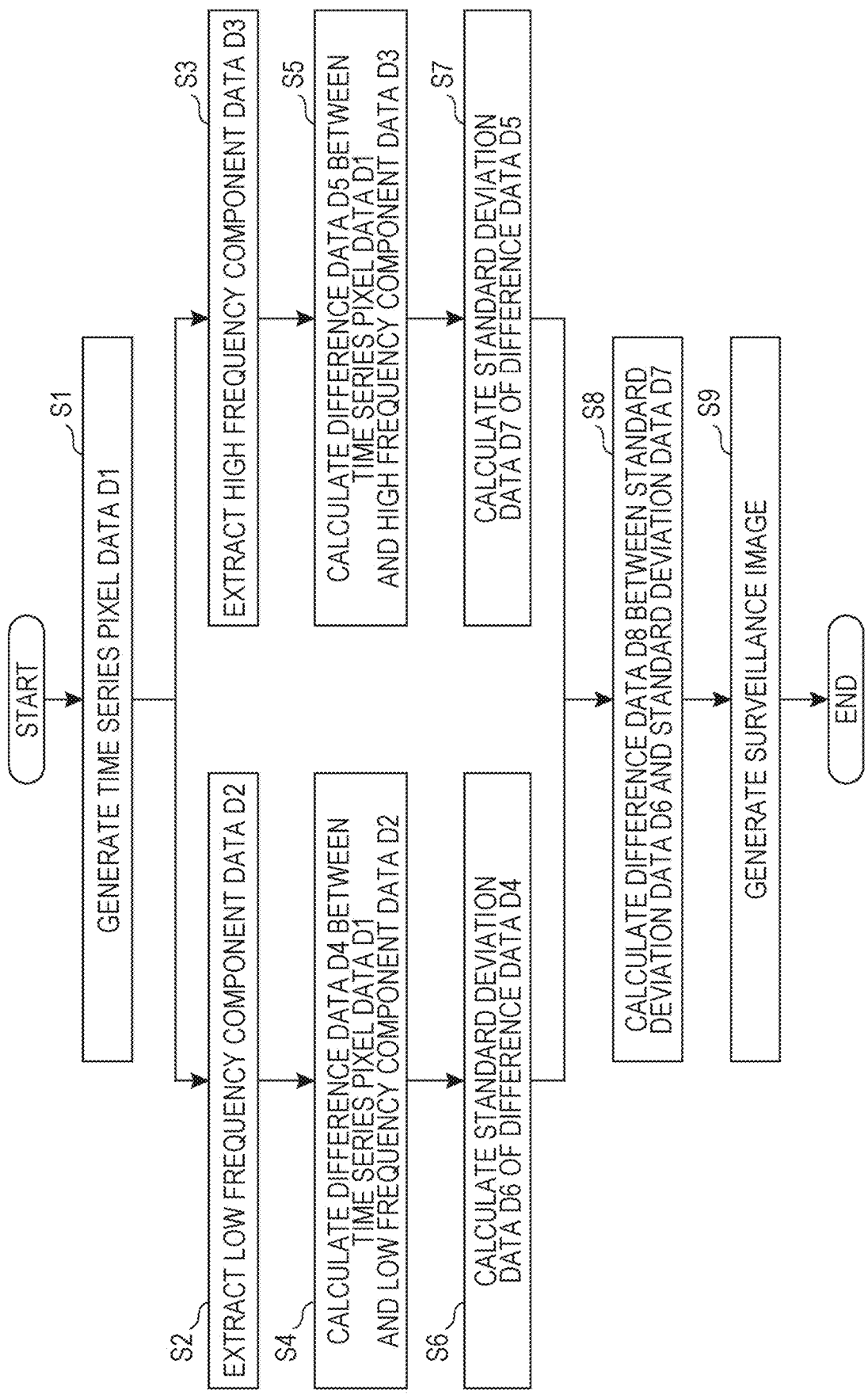

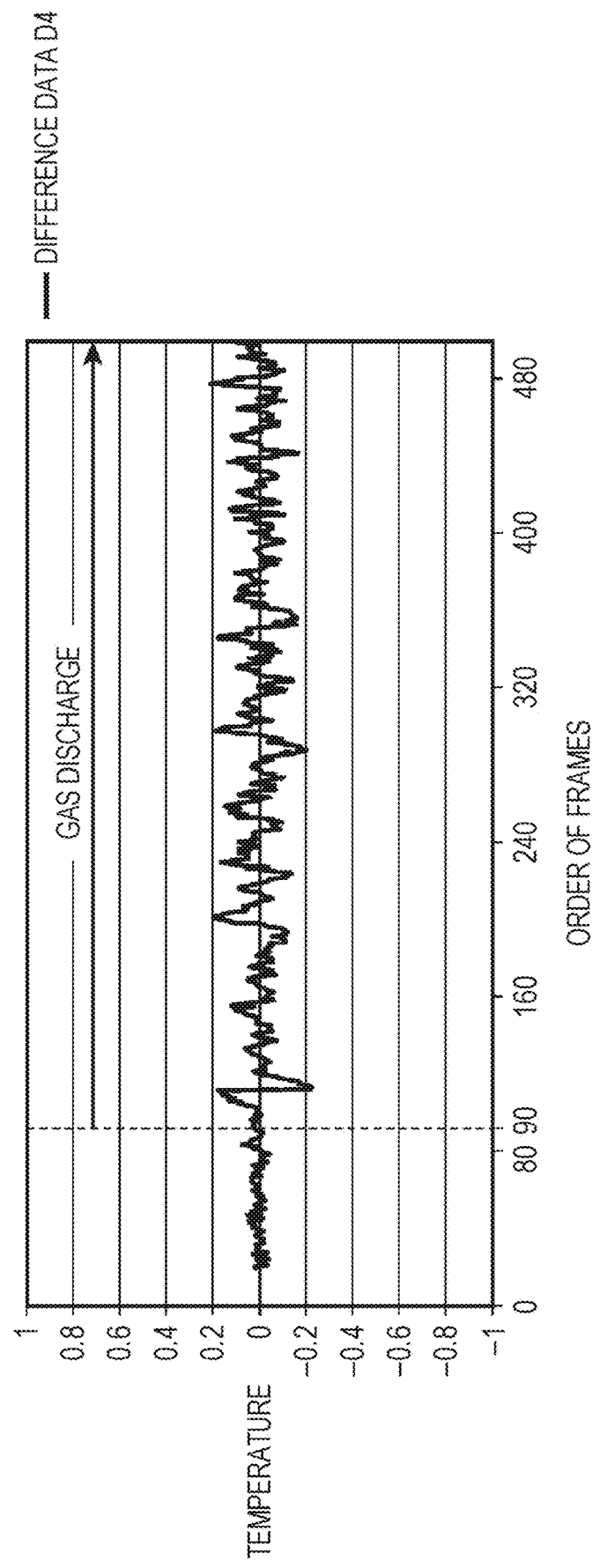

GAS DETECTION-USE IMAGE PROCESSING DEVICE, GAS DETECTION-USE IMAGE PROCESSING METHOD, AND GAS DETECTION-USE IMAGE PROCESSING PROGRAM

TECHNICAL FIELD

The present invention relates to a technology for detecting a gas by using an infrared image.

BACKGROUND ART

When a gas leak occurs, a slight temperature change occurs in a region where the leaked gas is in the air. As a technology for detecting a gas by using this principle, there is known a gas detection using an infrared image.

For example, as the gas detection using an infrared image, Patent Literature 1 discloses a gas leak detection device including: an infrared camera that captures an image of a region of an inspected object, and an image processing unit that processes an infrared image captured by the infrared camera, in which the image processing unit includes a fluctuation extracting unit that extracts dynamic fluctuation due to a gas leak from a plurality of infrared images arranged in time series.

The inventor has found that, in a case where a camera for capturing an infrared image is installed at an angle where the sky is included in the background, there is a possibility that a moving cloud is detected as a gas.

CITATION LIST

Patent Literature

Patent Literature 1: JP 2012-58093 A

SUMMARY OF INVENTION

An object of the present invention is to provide a gas detection-use image processing device, a gas detection-use image processing method, and a gas detection-use image processing program that enable an improvement of the accuracy of gas detection.

An gas detection-use image processing device according to a first aspect of the present invention for achieving the above object includes a processing unit, a decision unit, and a determination unit. The processing unit performs first processing of acquiring a first image including a region image illustrating a region where a gas candidate has appeared, extracted from a predetermined region of an infrared image, on each of a plurality of the infrared images captured at a plurality of different times to acquire a plurality of the first images. The decision unit decides a movement direction of the region image based on two of the first images, and decides similarity between the two first images, in consideration of the region image moving to the decided movement direction. The determination unit determines whether or not the gas candidate is a gas, based on the similarity decided by the decision unit and whether or not the region image is moved.

Advantages and features are provided according to one or more embodiments of the invention, which will be more fully understood from detailed descriptions as below and accompanying drawings. These detailed descriptions and the accompanying drawings are provided only by way of an example and are not intended as definition to limit the present invention.

BRIEF DESCRIPTION OF DRAWINGS

FIG. 5 is a flowchart for describing processing of generating a surveillance image.

FIG. 7A is a graph illustrating difference data D4.

DESCRIPTION OF EMBODIMENTS

Hereinafter, one or more embodiments of the present invention will be described with reference to the drawings. However, the scope of the invention is not limited to the disclosed embodiments.

In each figure, a component denoted by the same reference sign indicates the same component and the description thereof will not be repeated. Herein, components are generally denoted by the respective reference signs without indices (for example, the first image 1I) and are particularly denoted by the respective reference signs with indices (for example, a first image 1I-1).

Figure 1A:
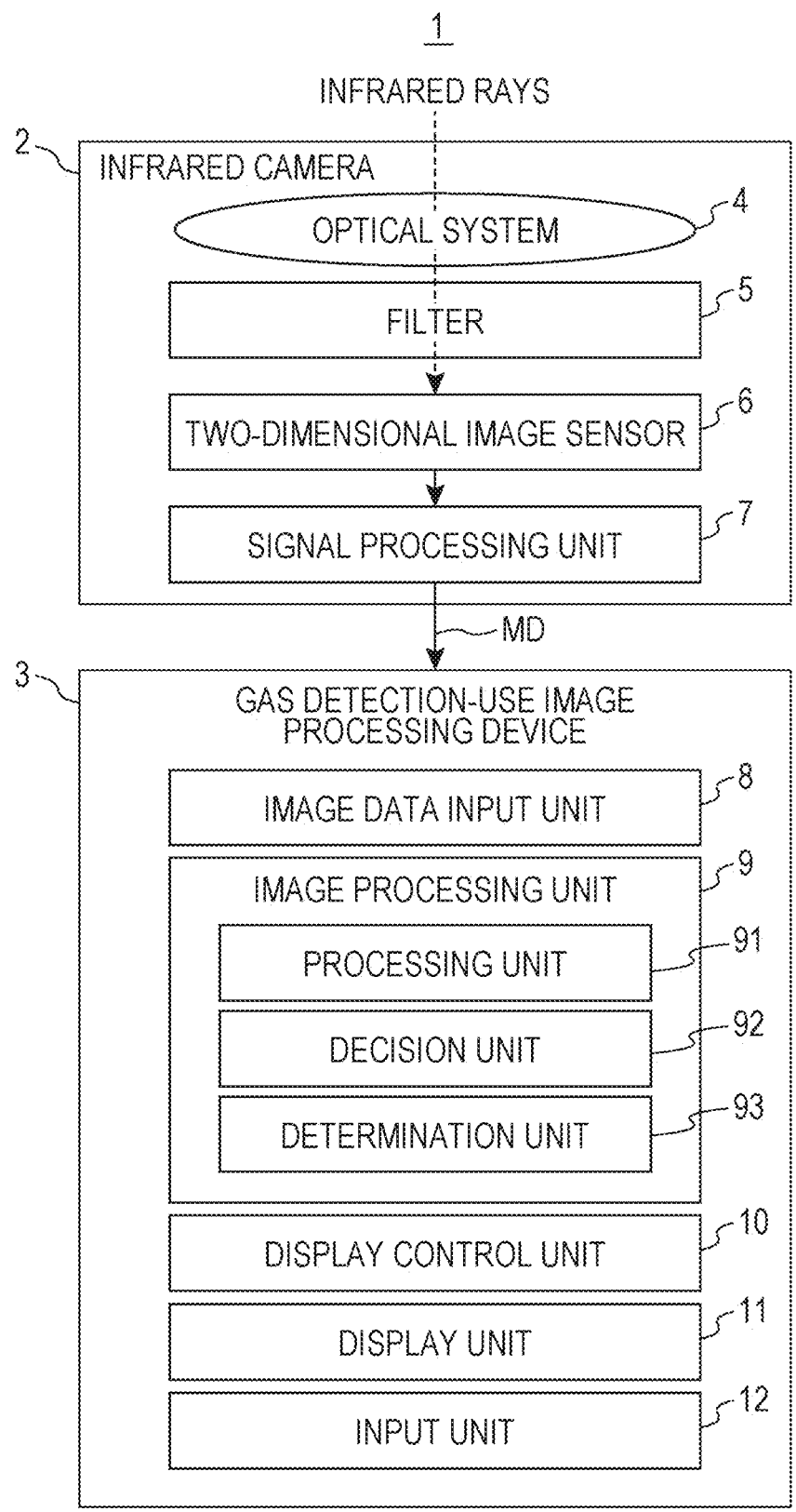
FIG. 1A is a block diagram illustrating a configuration of a gas detection system according to an embodiment.

FIG. 1A is a block diagram illustrating a configuration of a gas detection system 1 according to an embodiment. The gas detection system 1 includes an infrared camera 2 and a gas detection-use image processing device 3.

The infrared camera 2 captures a dynamic image of infrared images of a subject including a surveillance object (for example, a position where a gas transport pipes are connected) of a gas leak, and generates dynamic image data MD indicating the dynamic image. The dynamic image data MD may be a plurality of infrared images captured in time series, and is not limited to the dynamic image. The infrared camera 2 includes an optical system 4, a filter 5, a two-dimensional image sensor 6, and a signal processing unit 7.

The optical system 4 forms an infrared image of the subject on the two-dimensional image sensor 6. The filter 5 is disposed between the optical system 4 and the two-dimensional image sensor 6 and passes only infrared rays of a specific wavelength out of the light passing through the optical system 4. Out of a wavelength range of the infrared, a wavelength range for passing through the filter 5 depends on a type of a gas to be detected. For example, in a case of methane, a filter 5 for passing a wavelength range of 3.2 to 3.4 μm is used. The two-dimensional image sensor 6 is, for example, a cooled indium antimony (InSb) image sensor, and receives infrared rays that have passed through the filter 5. The signal processing unit 7 converts an analog signal output from the two-dimensional image sensor 6 into a digital signal, and performs known image processing. This digital signal is dynamic image data MD.

The gas detection-use image processing device 3 is a personal computer, a smartphone, a tablet terminal or the like, and includes an image data input unit 8, an image processing unit 9, a display control unit 10, a display unit 11, and an input unit 12 as functional blocks.

The image data input unit 8 is a communication interface for communicating with a communication unit (not illustrated) of the infrared camera 2. The dynamic image data MD sent from the communication unit of the infrared camera 2 is input to the image data input unit 8. The image data input unit 8 sends the dynamic image data MD to the image processing unit 9.

The image processing unit 9 is implemented by a Central Processing Unit (CPU), a Random Access Memory (RAM), a Read Only Memory (ROM), a Hard Disk Drive (HDD) or the like, and performs predetermined processing on the dynamic image data MD. For example, the predetermined processing is the processing of generating time series pixel data from the dynamic image data MD.

Figure 2:
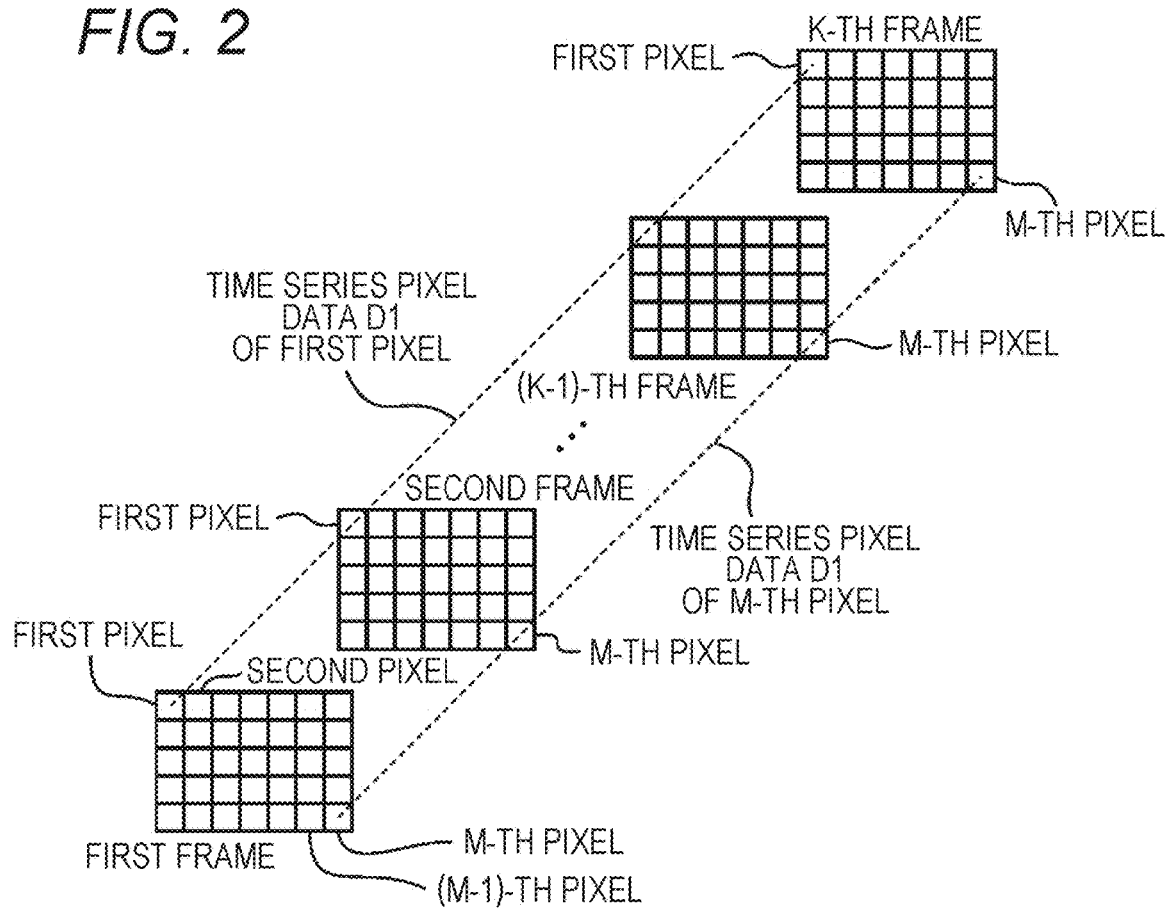
FIG. 2 is an explanatory view for describing time series pixel data D1.

The time series pixel data will be specifically described. FIG. 2 is an explanatory view for describing the time series pixel data D1. The dynamic image indicated by the dynamic image data MD has a structure in which a plurality of frames is arranged in time series. Data in which pixel data of pixels at the same positions in a plurality of frames (a plurality of infrared images) are arranged in time series is set as time series pixel data D1. The number of the dynamic image of these infrared images is set to K. One frame is configured with an M number of pixels, that is, a first pixel, a second pixel, and, . . . , an (M−1)-th pixel, and an M-th pixel. Physical quantities such as luminance and temperature are determined based on pixel data (pixel values).

The pixels at the same positions of a plurality of frames (a K number of frames) mean pixels in the same order. For example, it is described based on the first pixel that data obtained by arranging pixel data of the first pixel included in a first frame, pixel data of the first pixel included in a second frame, and, . . . , pixel data of the first pixel included in a (K−1)-th frame, and pixel data of the first pixel included in a K-th frame in time series is set as time series pixel data D1 of the first pixel. Also, it is described based on the M-th pixel that data obtained by arranging pixel data of the M-th pixel included in the first frame, pixel data of the M-th pixel included in the second frame, and, . . . , pixel data of the M-th pixel included in the (K−1)-th frame, and pixel data of the M-th pixel included in the K-th frame in time series is set as time series pixel data D1 of the M-th pixel. The number of time series pixel data D1 is the same as the number of pixels configuring one frame.

With reference to FIG. 1A, the image processing unit 9 includes a processing unit 91, a decision unit 92, and a determination unit 93. These will be described later.

The display control unit 10 is implemented by a CPU, a RAM, a ROM, an HDD, and the like, and causes the display unit 11 to display an image or the like indicated by the dynamic image data MD. The display unit 11 is implemented by, for example, a liquid crystal display.

The input unit 12 is implemented by a keyboard, a touch panel or the like, and receives various types of inputs related to gas detection. Although the gas detection-use image processing device 3 according to the embodiment includes the display control unit 10, the display unit 11, and the input unit 12, the gas detection-use image processing device 3 which does not include these units may be used.

Figure 1B:
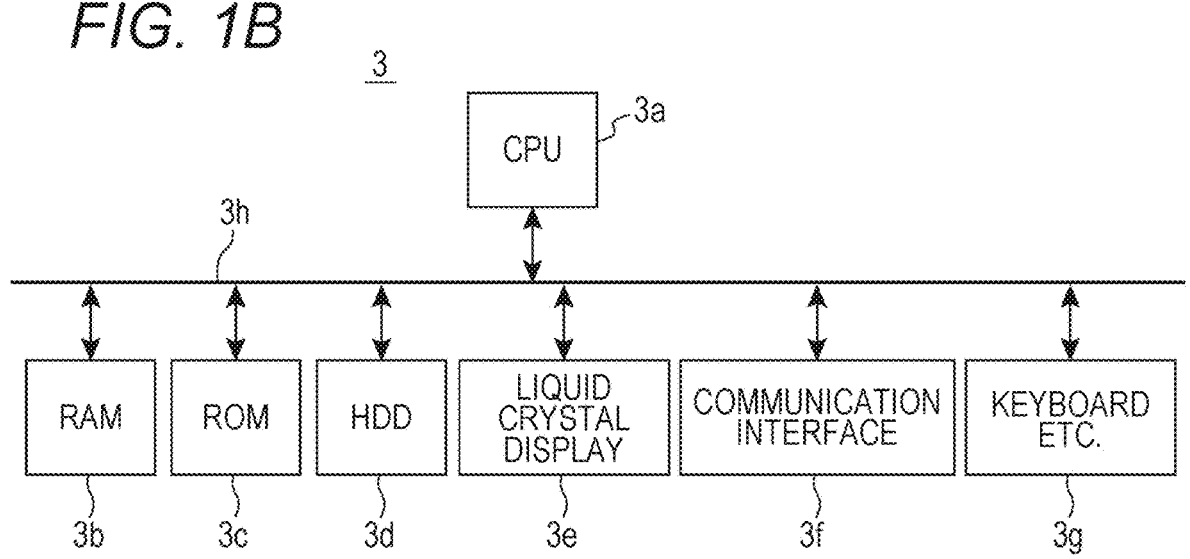
FIG. 1B is a block diagram illustrating a hardware configuration of the gas detection-use image processing device illustrated in FIG. 1A.

FIG. 1B is a block diagram illustrating a hardware configuration of the gas detection-use image processing device 3 illustrated in FIG. 1A. The gas detection-use image processing device 3 includes a CPU 3a, a RAM 3b, a ROM 3c, an HDD 3d, a liquid crystal display 3e, a communication interface 3f, a keyboard 3g, and a bus 3h for connecting these components. The liquid crystal display 3e is hardware that implements the display unit 11. Instead of the liquid crystal display 3e, an organic EL display (Organic Light Emitting Diode display), a plasma display or the like may be used. The communication interface 3f is hardware that implements the image data input unit 8. The keyboard 3g is hardware that implements the input unit 12.

The HDD 3d stores programs for implementing the image processing unit 9 and the display control unit 10 as the functional blocks, respectively. The program for implementing the image processing unit 9 is a processing program that acquires the dynamic image data MD and performs the predetermined processing on the dynamic image data MD.

The program for implementing the display control unit 10 is a display control program for causing the display unit 11 to display an image (for example, the dynamic image indicated by the dynamic image data MD). These programs may be stored in the ROM 3c instead of the HDD 3d.

The CPU 3a reads out the processing program and the display control program from the HDD 3d, develops the processing program and the display control program in the RAM 3b, and executes the developed program to implement these functional blocks. Although the processing program and the display control program are stored in advance in the HDD 3d, the present invention is not limited thereto. For example, a recording medium (for example, an external recording medium such as a magnetic disk or an optical disk) recording these programs may be prepared, and the programs stored in this recording medium may be stored in the HDD 3d. Also, these programs may be stored in a server connected to the gas detection-use image processing device 3 through a network, and these programs may be sent to the HDD 3d through the network and stored in the HDD 3d.

Incidentally, the gas detection-use image processing device 3 is configured with a plurality of elements. Therefore, a program for implementing these elements is stored in the HDD 3d. For example, the gas detection-use image processing device 3 includes, as elements, a processing unit 91, a decision unit 92, and a determination unit 93. The HDD 3d stores programs for implementing the processing unit 91, the decision unit 92, and the determination unit 93, respectively. These programs are represented as a processing program, a decision program, and a determination program.

An HDD storing the processing program, an HDD storing the decision program, and an HDD storing the determination program may be different from one another. In this case, a server that has the HDD storing the processing program, a server having the HDD storing the decision program, and a server that has the HDD storing the determination program may be connected through a network (for example, the Internet). Alternatively, at least one HDD may be an external HDD connected to a USB port or the like, or a network compatible HDD (Network Attached Storage, NAS). At least two or more of these programs may be stored in the same HDD, and the remaining programs may be stored in an HDD different from this HDD (for example, the processing program and the decision program are stored in a first HDD, and the determination program is stored in a second HDD).

These programs are represented using the definition of elements. The processing unit and the processing program will be described as an example. The processing unit performs first processing of acquiring a first image including a region image illustrating a region where a gas candidate has appeared, extracted from a predetermined region of an infrared image, on each of a plurality of the infrared images captured at a plurality of different times to acquire a plurality of the first images. The first processing program is a program that performs first processing of acquiring a first image including a region image illustrating a region where a gas candidate has appeared, extracted from a predetermined region of an infrared image, on each of a plurality of the infrared images captured at a plurality of different times to acquire a plurality of the first images.

Figure 15:
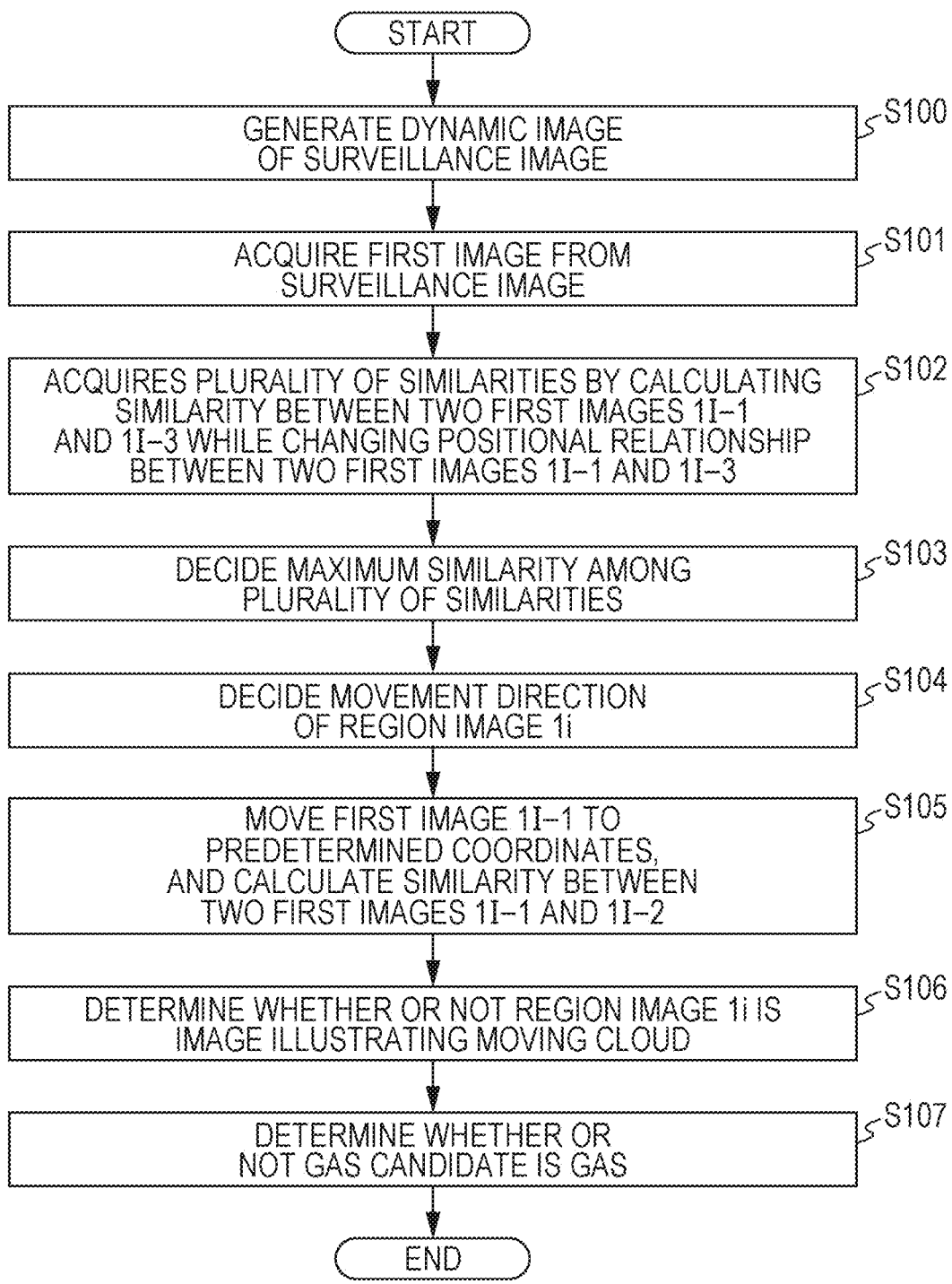
FIG. 15 is a flowchart of processing performed according to the embodiment.

A flowchart of these programs (the processing program, the processing program, the decision program, and the determination program) executed by the CPU 3a is illustrated in FIG. 15 to be described later.

In the gas detection using an infrared image, the inventor has found that, in a case where a gas leak and background temperature change occur in parallel and background temperature change is larger than temperature change due to the leaked gas, it is not possible to display a scene of a gas leaking in an image, without considering background temperature change. This will be described in detail.

Figure 3:
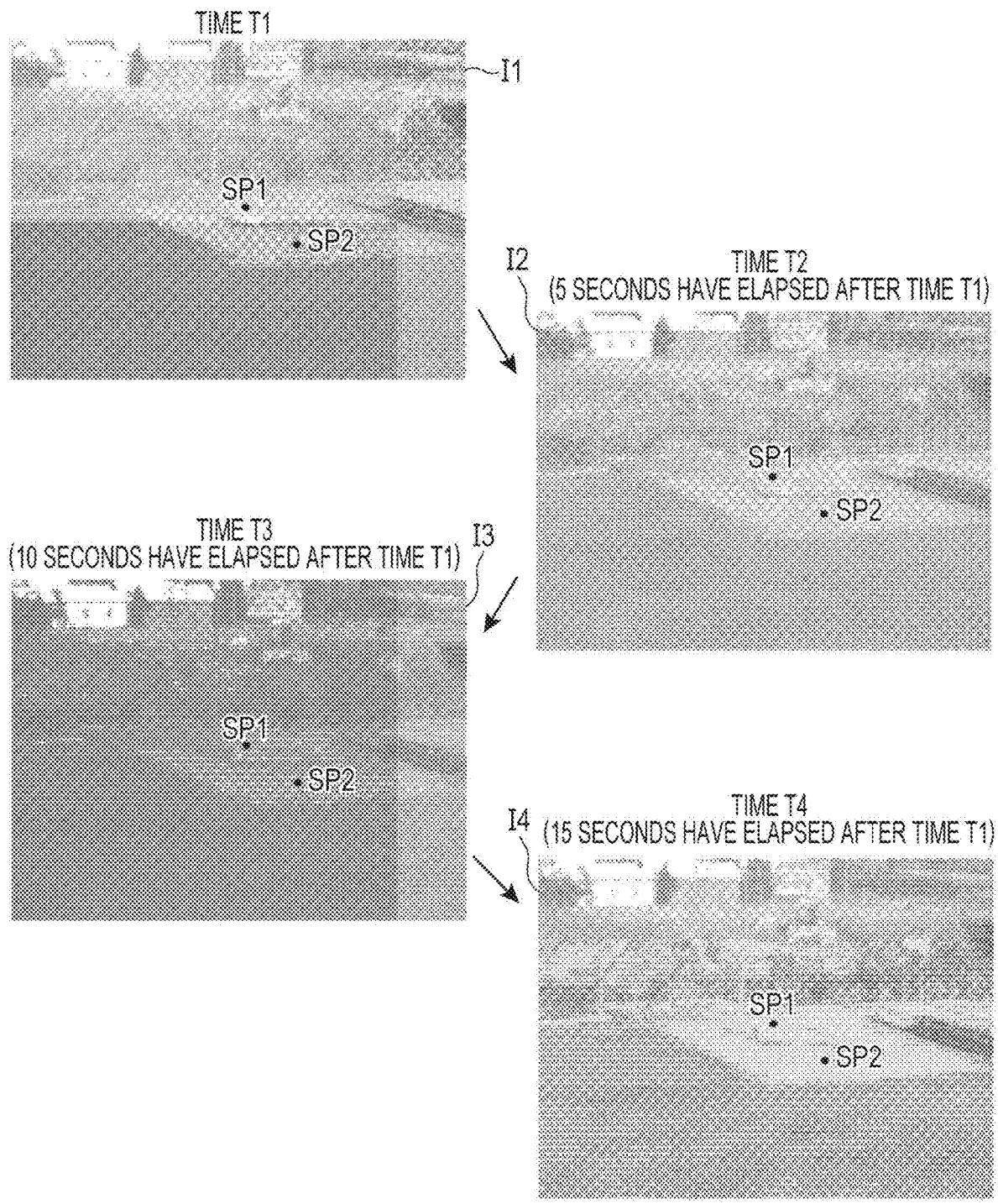
FIG. 3 is an image view illustrating, in time series, infrared images obtained by capturing of images of a test site of the outdoor in a state where a gas leak and background temperature change have occurred in parallel.

FIG. 3 is an image view illustrating, in time series, infrared images obtained by capturing images of the test site of the outdoor, in a state where a gas leak and background temperature change have occurred in parallel. These are infrared images obtained by capturing a dynamic image with an infrared camera. At the test site, there is a point SP1 at which a gas may be discharged. In comparison with the point SP1, there is illustrated a point SP2 at which a gas is not discharged.

The image I1 is an infrared image of the test site captured at time T1 immediately before sunlight is blocked by a cloud. The image I2 is an infrared image of the test site captured at time T2 after 5 seconds from the time T1. Since sunlight is blocked by a cloud, the background temperature at the time T2 is lower than the background temperature at the time T1.

The image I3 is an infrared image of the test site captured at time T3 after 10 seconds from the time T1. Since a state in which sunlight is blocked by a cloud continues from the time T2 to the time T3, the background temperature at the time T3 is lower than the background temperature at the time T2.

The image I4 is an infrared image of the test site captured at time T4 after 15 seconds after the time T1. Since the state in which sunlight is blocked by a cloud continues from the time T3 to the time T4, the background temperature at the time T4 is lower than the background temperature at the time T3.

The background temperature drops by about 4° C. for 15 seconds from the time T1 to the time T4. Therefore, it can be seen that the image I4 is darker than the image I1 on the whole and background temperature is lowered.

At a time after the time T1 and before the time T2, a gas starts to be discharged at the point SP1. A temperature change due to the discharged gas is slight (about 0.5° C.). Therefore, although, at the time T2, the time T3 and the time T4, a gas has been discharged at the point SP1, background temperature change is much larger than temperature change due to the discharged gas, so that it is not possible to see a scene of a gas coming out from the point SP1, even when looking at the image I2, the image I3, and the image I4.

Figure 4A:
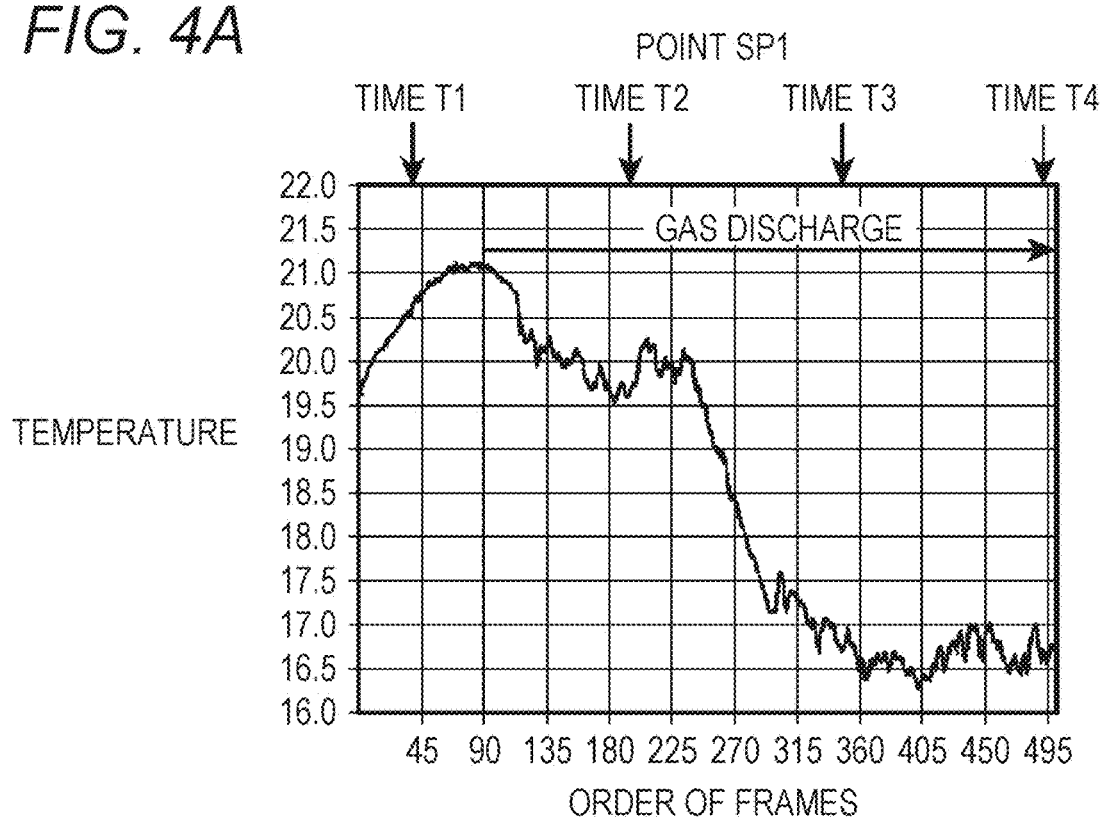
FIG. 4A is a graph illustrating temperature change of a point SP1 at the test site.
Figure 4B:
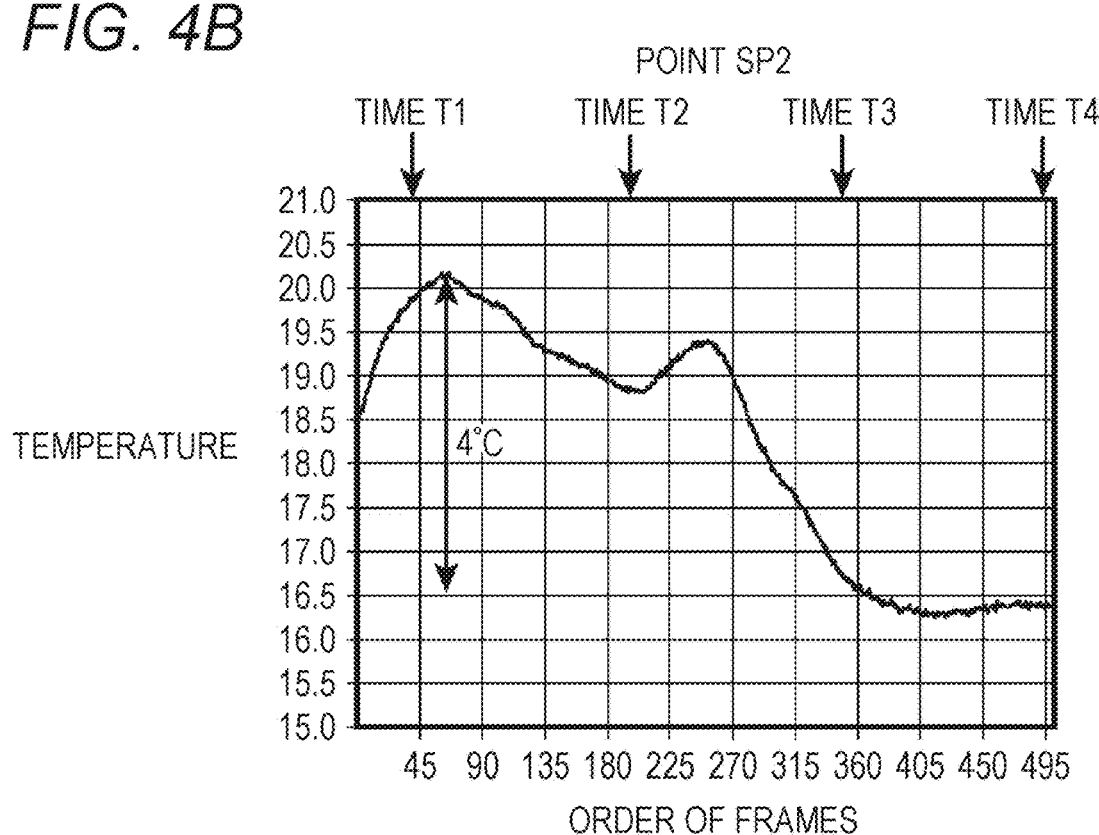
FIG. 4B is a graph illustrating temperature change of a point SP2 at the test site.

FIG. 4A is a graph illustrating the temperature change of the point SP1 at the test site, and FIG. 4B is a graph illustrating the temperature change of the point SP2 at the test site. Vertical axes of these graphs indicate temperature. Horizontal axes of these graphs indicate an order of frames. For example, 45 means a 45-th frame. A frame rate is 30 fps. Thus, a time period from the first frame to the 450-th frame is 15 seconds.

The graph illustrating the temperature change of the point SP1 and the graph illustrating the temperature change of the point SP2 are different. Since no gas is discharged at the point SP2, the temperature change of the point SP2 indicates background temperature change. On the contrary, since a gas is discharged at the point SP1, the gas is in the air at the point SP1. Therefore, the temperature change of the point SP1 indicates temperature change obtained by adding background temperature change and temperature change due to the leaked gas.

From the graph illustrated in FIG. 4A, it can be seen that a gas has been discharged at the point SP1 (that is, it can be seen that a gas leak has occurred at the point SP1). However, as described above, it can not be seen, from the image I2, the image I3 and the image I4 illustrated in FIG. 3, that the gas has been discharged at the point SP1 (that is, it can not be seen that a gas leak has occurred at the point SP1).

In this way, in a case where background temperature change is much larger than temperature change due to the discharged gas (leaked gas), it is not possible to see a scene of a gas coming out from the point SP1, even when looking at the image I2, the image I3 and the image I4 illustrated in FIG. 3.

This reason is that, in addition to frequency component data indicating temperature change due to the leaked gas, low frequency component data D2 indicating background temperature change, which has frequency lower than that of this frequency component data, is included in the dynamic image data MD (FIG. 1A). Due to an image indicated by low frequency component data D2 (a change of light or dark of the background), an image indicated by frequency component data is invisible. With reference to FIGS. 4A and 4B, fine changes included in the graph illustrating the temperature change of point SP1 correspond to frequency component data. The graph illustrating the temperature change of the point SP2 corresponds to low frequency component data D2.

In this regard, the image processing unit 9 (FIG. 1A) generates, from the dynamic image data MD, a plurality of time series pixel data D1 (that is, a plurality of time series pixel data D1 configuring the dynamic image data MD) having different pixel positions, and performs processing of removing low frequency component data D2 from each of the plurality of time series pixel data D1. With reference to FIG. 2, a plurality of time series pixel data having different pixel positions means time series pixel data D1 of the first pixel, time series pixel data D1 of the second pixel, and, . . ., time series pixel data D1 of the (M−1)-th pixel and time series pixel data D1 of the M-th pixel.

Frequency component data indicating a high frequency noise, which has higher frequency than that of frequency component data indicating temperature change due to the leaked gas, is set as high frequency component data D3. In addition to the processing of removing low frequency component data D2, the image processing unit 9 performs processing of removing high frequency component data D3 from each of the plurality of time series pixel data D1 configuring the dynamic image data MD.

In this way, the image processing unit 9 performs processing of removing low frequency component data D2 and high frequency component data D3 in units of time series pixel data D1, instead of performing processing of removing low frequency component data D2 and high frequency component data D3 in units of a frame.

The gas detection-use image processing device 3 generates a surveillance image by using an infrared image. In a case where a gas leak has occurred, the surveillance image includes an image illustrating a region where a gas has appeared due to the gas leak. The gas detection-use image processing device 3 detects a gas leak based on the surveillance image. There are various methods of generating the surveillance image. Herein, an example of a method of generating the surveillance image will be described. The surveillance image is generated by using infrared images of the surveillance object and the background. FIG. 5 is a flowchart for describing the surveillance image generation process.

With reference to FIGS. 1A, 2 and 5, the image processing unit 9 generates an M number of time series pixel data D1 from the dynamic image data MD (step S1).

The image processing unit 9 sets, as low frequency component data D2, data extracted from the time series pixel data D1 by calculating a simple moving average with respect to time series pixel data D1, in units of a first predetermined number of frames less than a K number of frames, and extracts an M number of low frequency component data D2 respectively corresponding to the M number of time series pixel data D1 (step S2).

The first predetermined number of frames is, for example, 21 frames. The details of frames are as follows: a target frame, 10 consecutive frames before the target frame, and 10 consecutive frames after the target frame. The first predetermined number may be any number as long as low frequency component data D2 is extracted from the time series pixel data D1, and may be more than 21 or less than 21, without being limited to 21.

The image processing unit 9 sets, as high frequency component data D3, data extracted from time series pixel data D1 by calculating a simple moving average with respect to time series pixel data D1, in units of a third predetermined number (for example, 3) of frames less than the first predetermined number (for example, 21) of frames, and extracts an M number of high frequency component data D3 respectively corresponding to the M number of time series pixel data D1 (step S3).

Figure 6:
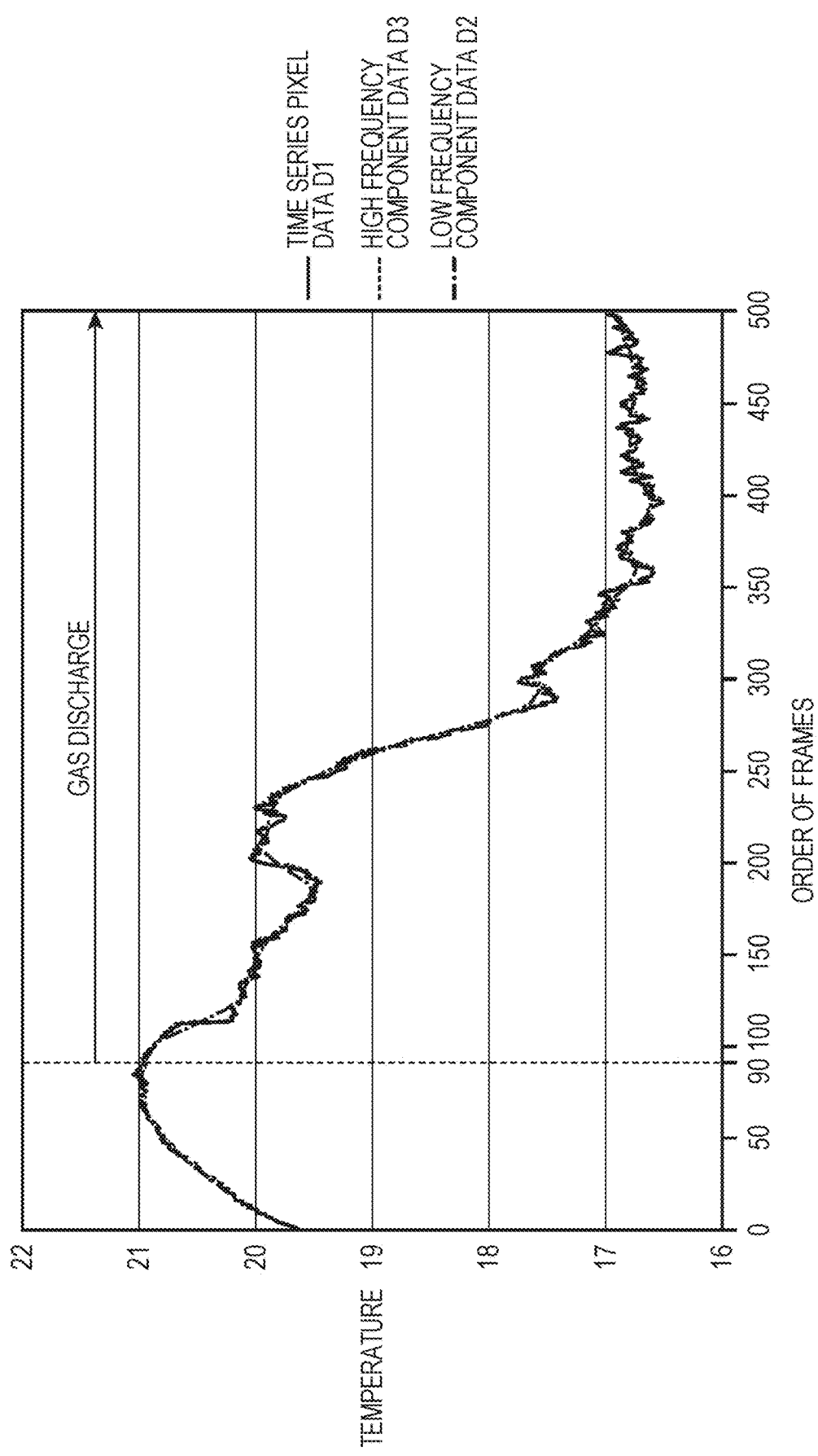
FIG. 6 is a graph illustrating time series pixel data D1 of a pixel corresponding to a point SP1 (FIG. 3), low frequency component data D2 extracted from the time series pixel data D1, and high frequency component data D3 extracted from the time series pixel data D1.

FIG. 6 is a graph illustrating time series pixel data D1 of the pixel corresponding to the point SP1 (FIG. 4A), low frequency component data D2 extracted from the time series pixel data D1, and high frequency component data D3 extracted from the time series pixel data D1. The vertical and horizontal axes of the graph are the same as the vertical and horizontal axes of the graph in FIG. 4A. The temperature indicated by the time series pixel data D1 changes relatively rapidly (a period of change is relatively short), and the temperature indicated by low frequency component data D2 changes relatively slowly (a period of change is relatively long). The high frequency component data D3 looks substantially overlapped with the time series pixel data D1.

The third predetermined number of frames is, for example, 3 frames. The details of frames are as follows: a target frame, one frame immediately before the target frame, and one frame immediately after the target frame. The third predetermined number may be any number as long as a third frequency component is extracted from time series pixel data, and may be more than 3, without being limited to 3.

With reference to FIGS. 1A, 2 and 5, the image processing unit 9 sets, as difference data D4, data obtained by calculating a difference between time series pixel data D1 and low frequency component data D2 extracted from the time series pixel data D1, and calculates an M number of difference data D4 respectively corresponding to the M number of time series pixel data D1 (step S4).

The image processing unit 9 sets, as difference data D5, data obtained by calculating a difference between time series pixel data D1 and high frequency component data D3 extracted from the time series pixel data D1, and calculates an M number of difference data D5 respectively corresponding to the M number of time series pixel data D1 (step S5).

Figure 7B:
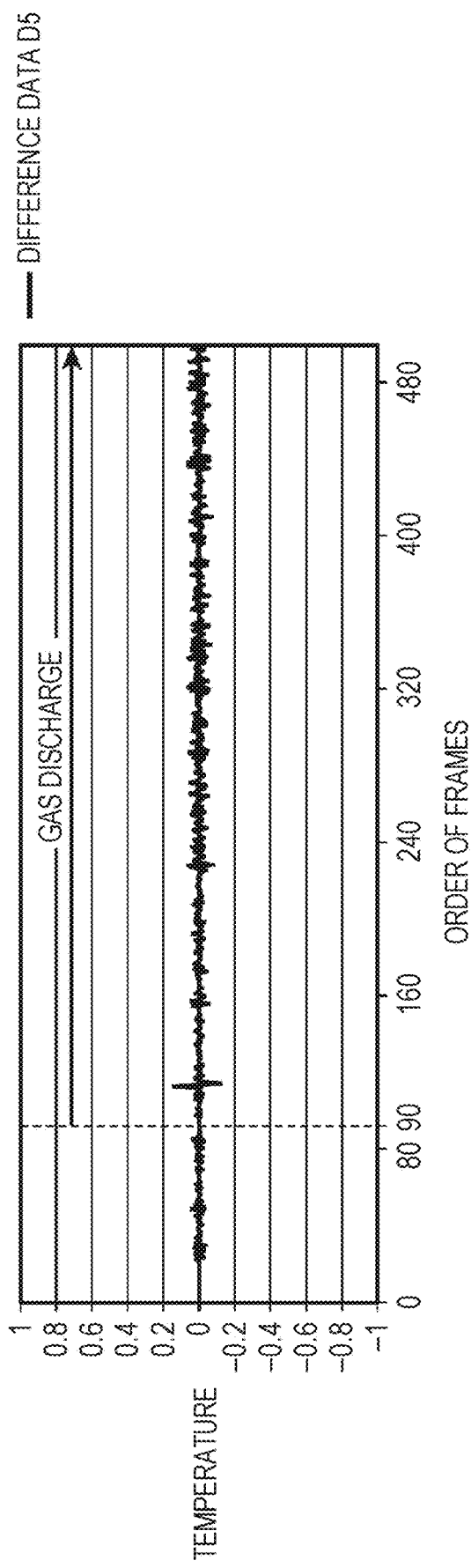
FIG. 7B is a graph illustrating difference data D5.

FIG. 7A is a graph illustrating difference data D4, and FIG. 7B is a graph illustrating difference data D5. The vertical and horizontal axes of these graphs are the same as the vertical and horizontal axes of the graph in FIG. 4A. The difference data D4 is data obtained by calculating a difference between the time series pixel data D1 and low frequency component data D2 illustrated in FIG. 6. Before discharge of a gas is started at the point SP1 illustrated in FIG. 4A (frames up to about the 90-th frame), the repetition of a fine amplitude indicated by difference data D4 mainly indicates a sensor noise of the two-dimensional image sensor 6. After discharge of a gas is started at the point SP1 (the 90-th and subsequent frames), variations in the amplitude and waveform of difference data D4 are large.

The difference data D5 is data obtained by calculating a difference between the time series pixel data D1 and high frequency component data D3 illustrated in FIG. 6.

The difference data D4 includes frequency component data indicating temperature change due to the leaked gas and high frequency component data D3 (data indicating a high frequency noise). The difference data D5 does not include frequency component data indicating temperature change due to the leaked gas, but includes high frequency component data D3.

Since difference data D4 includes frequency component data indicating temperature change due to the leaked gas, variations in the amplitude and waveform of difference data D4 are large, after the discharge of a gas is started at the point SP1 (the 90-th and subsequent frames). On the contrary, since difference data D5 does not include frequency component data indicating temperature change due to the leaked gas, variations in the amplitude and waveform of difference data D5 are not large. The difference data D5 indicates the repetition of fine amplitudes. This indicates a high frequency noise.

Although difference data D4 and difference data D5 are correlated, difference data D4 and difference data D5 are not completely correlated. That is, there is a case where, in a certain frame, a value of difference data D4 may be positive and a value of difference data D5 may be negative, or vice versa. Therefore, even though a difference between difference data D4 and difference data D5 is calculated, it is not possible to remove high frequency component data D3. In order to remove high frequency component data D3, it is necessary to convert difference data D4 and difference data D5 into values such as absolute values between which a subtraction is performable.

In this regard, the image processing unit 9 sets, as standard deviation data D6, data obtained by calculating a moving standard deviation with respect to difference data D4, in units of a second predetermined number of frames less than the K number of frames, and calculates an M number of standard deviation data D6 respectively corresponding to the M number of time series pixel data D1 (step S6). Incidentally, instead of the moving standard deviation, a moving variance may be calculated.

Also, the image processing unit 9 sets, as standard deviation data D7, data obtained by calculating a moving standard deviation with respect to difference data D5, in units of a fourth predetermined number (for example, 21) of frames less than the K number of frames, and calculates an M number of standard deviation data D7 respectively corresponding to the M number of time series pixel data D1 (step S7). Instead of the moving standard deviation, the moving variance may be used.

Figure 8:
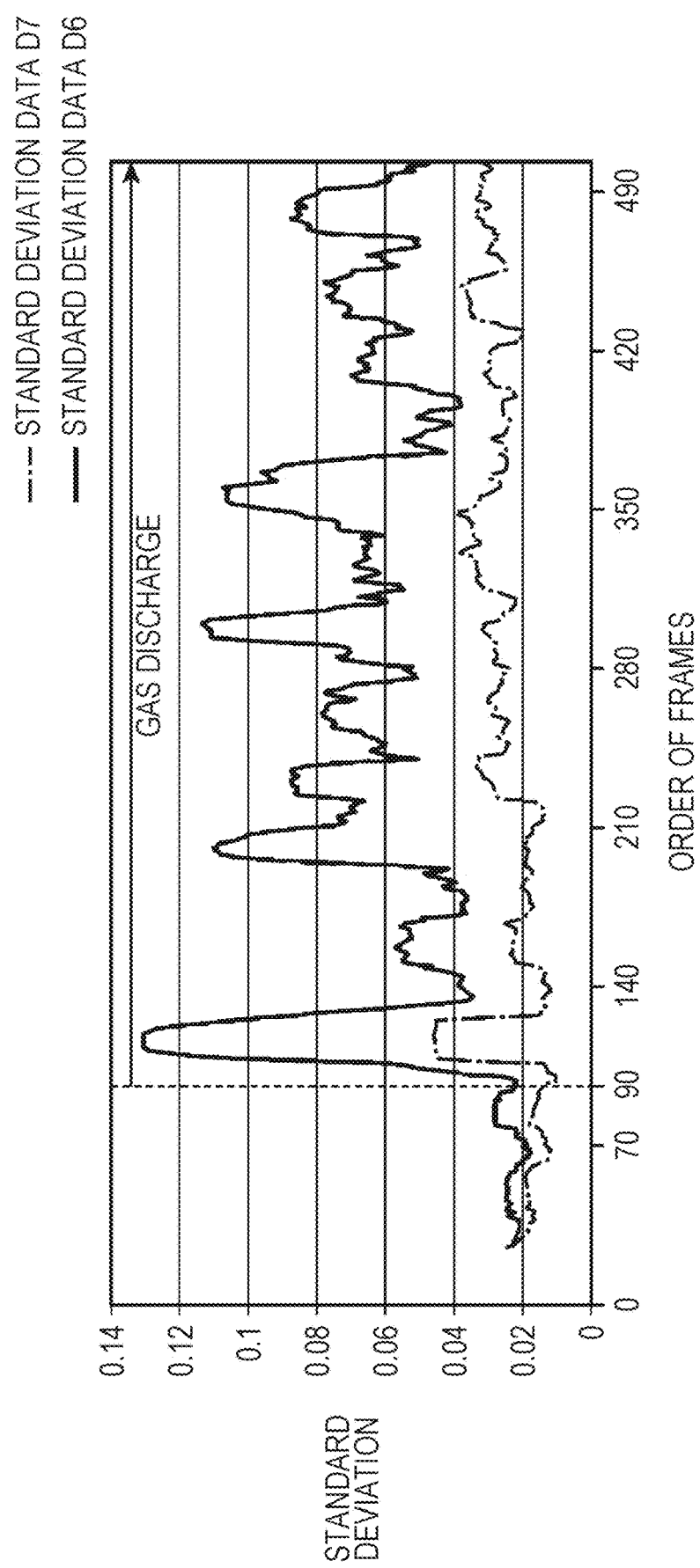
FIG. 8 is a graph illustrating standard deviation data D6 and standard deviation data D7.

FIG. 8 is a graph illustrating standard deviation data D6 and standard deviation data D7. The horizontal axis of the graph is the same as the horizontal axis of the graph in FIG. 4A. The vertical axis of the graph indicates standard deviation. The standard deviation data D6 is data indicating the moving standard deviation of difference data D4 illustrated in FIG. 7A. The standard deviation data D7 is data indicating the moving standard deviation of difference data D5 illustrated in FIG. 7B. Although the number of frames used for calculating the moving standard deviation is 21 for both of standard deviation data D6 and standard deviation data D7, the number of frames may be any number as long as a statistically significant standard deviation is obtained, without being limited to 21.

Since standard deviation data D6 and standard deviation data D7 are standard deviations, standard deviation data D6 and standard deviation data D7 do not include negative values. Therefore, it is possible to regard standard deviation data D6 and standard deviation data D7 as data converted such that a subtraction between difference data D4 and difference data D5 is performable.

The image processing unit 9 sets, as difference data D8, data obtained by calculating a difference between standard deviation data D6 and standard deviation data D7 obtained from the same time series pixel data D1, and calculates an M number of difference data D8 respectively corresponding to the M number of time series pixel data D1 (step S8).

Figure 9:
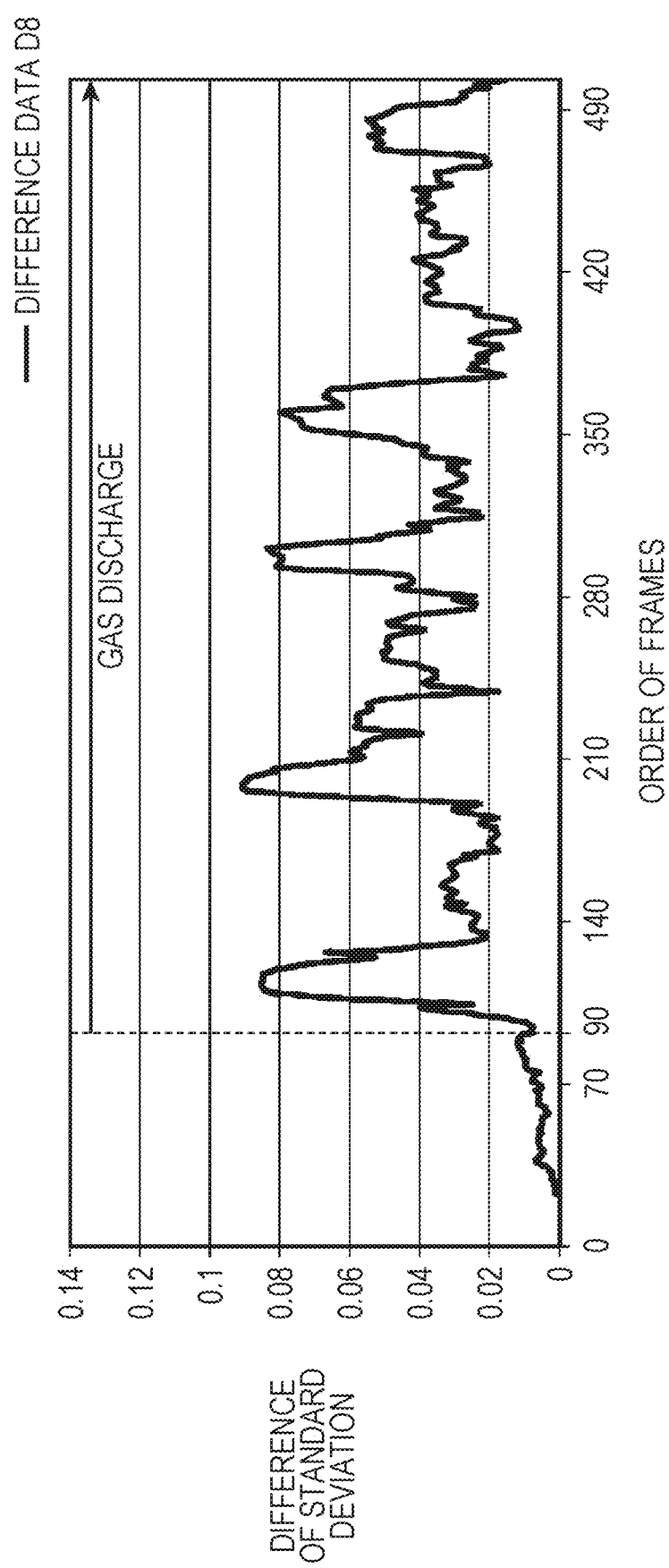
FIG. 9 is a graph illustrating difference data D8.

FIG. 9 is a graph illustrating difference data D8. The horizontal axis of the graph is the same as the horizontal axis of the graph in FIG. 4A. The vertical axis of the graph is difference of standard deviation. The difference data D8 is data indicating a difference between standard deviation data D6 and standard deviation data D7 illustrated in FIG. 8. The difference data D8 is data on which the processing of removing low frequency component data D2 and high frequency component data D3 is performed.

The image processing unit 9 generates a surveillance image (step S9). That is, the image processing unit 9 generates a dynamic image configured with the M number of difference data D8 obtained in step S8. Each frame configuring this dynamic image is a surveillance image. The surveillance image is an image in which difference of standard deviation is visualized. The image processing unit 9 outputs the dynamic image obtained in step S9 to the display control unit 10. The display control unit 10 causes the display unit 11 to display this dynamic image. As surveillance images included in this dynamic image, for example, there are the image I12 illustrated in FIG. 10 and the image I15 illustrated in FIG. 11.

Figure 10:
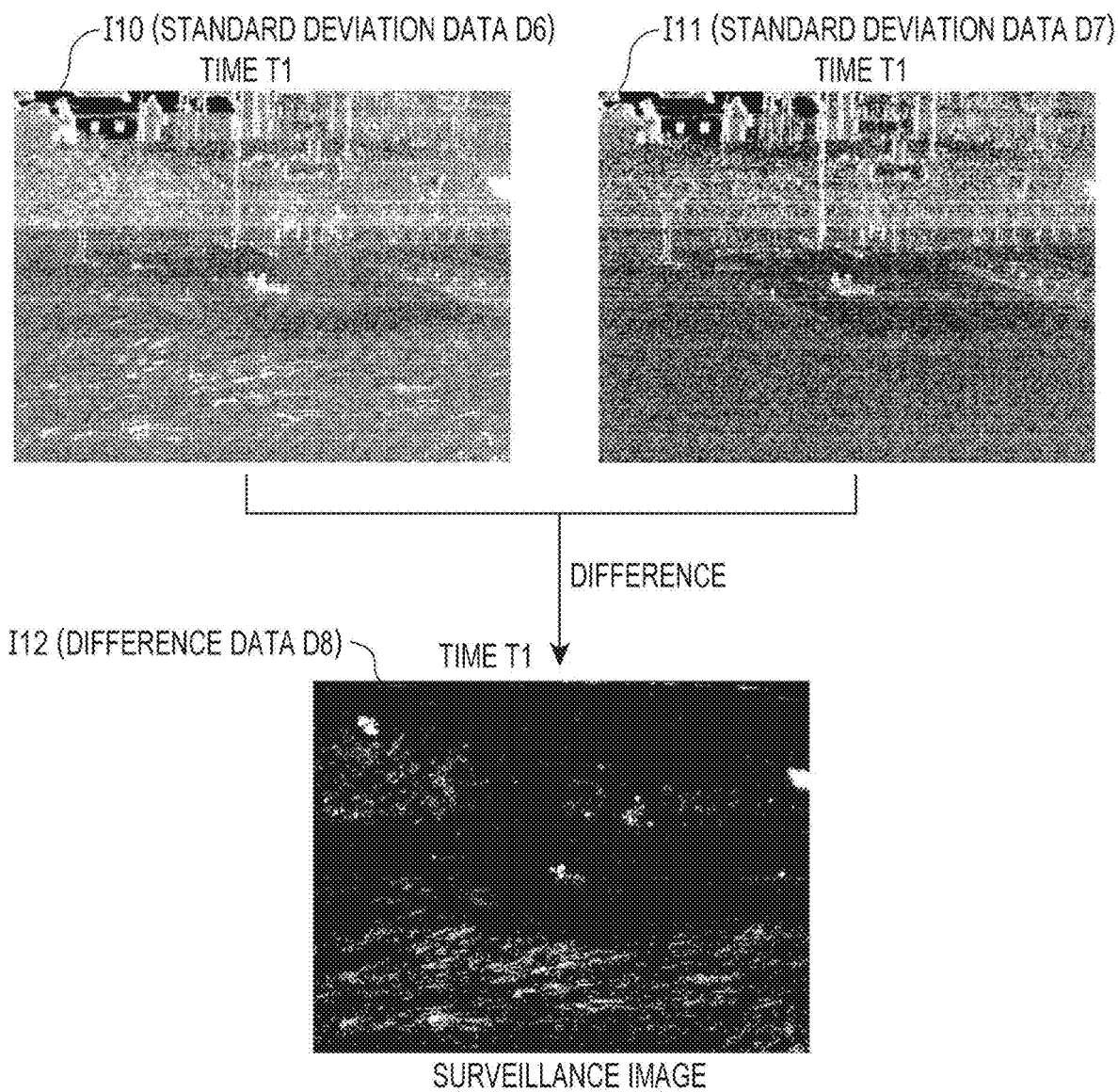
FIG. 10 is an image view illustrating an image I10, an image I11, and an image I12 generated based on a frame at time T1.

FIG. 10 is an image view illustrating an image I10, an image I11 and an image I12 generated based on a frame at time T1. The image I10 is an image of a frame at time T1 in a dynamic image indicated by the M number of standard deviation data D6 obtained in step S6 of FIG. 5. The image I14 is an image of a frame at time T1 in a dynamic image indicated by the M number of standard deviation data D7 obtained in step S7 of FIG. 5. A difference between the image I10 and the image I11 is an image I12 (surveillance image).

Figure 11:
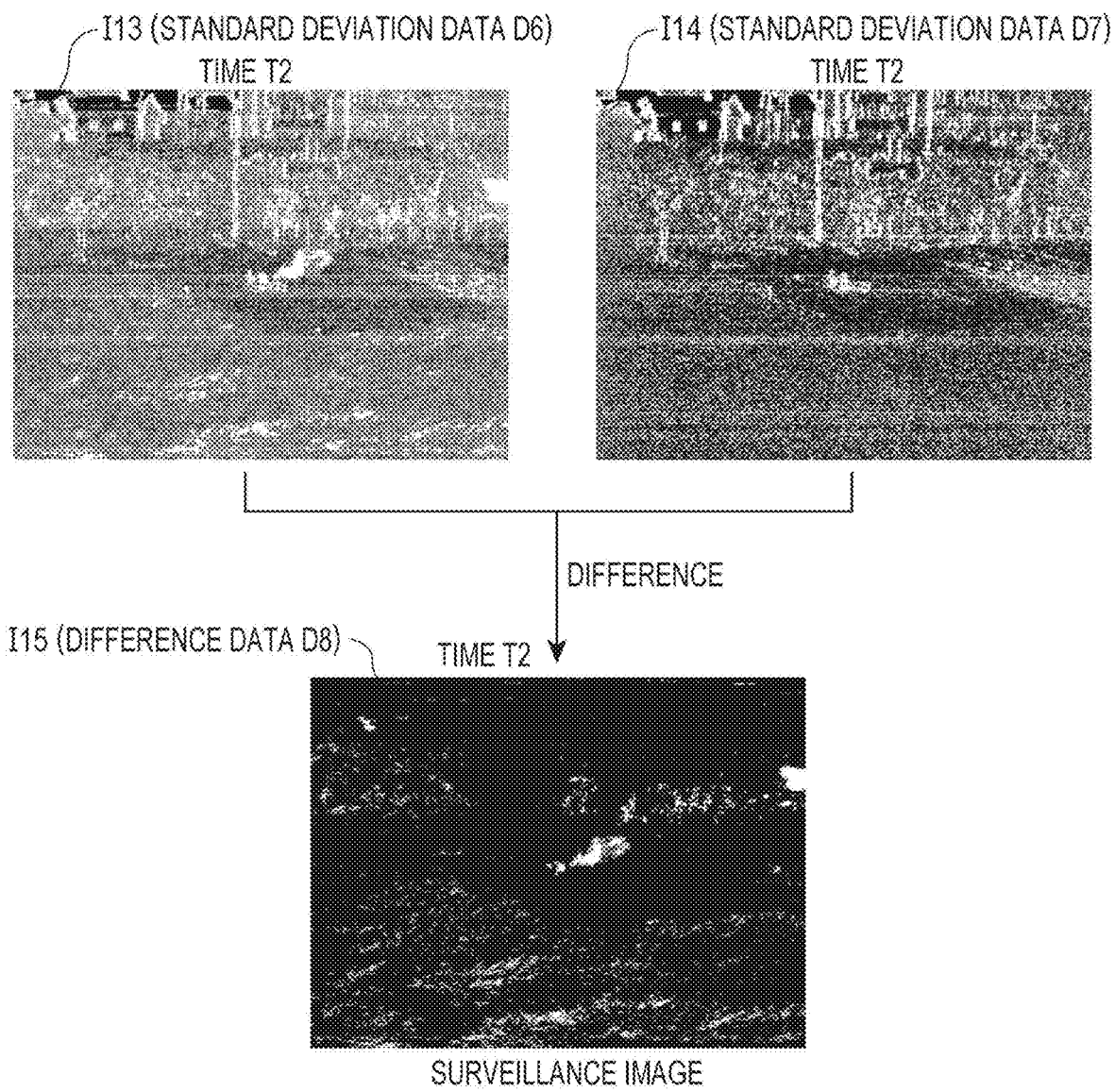
FIG. 11 is an image view illustrating an image I13, an image I14, and an image I15 generated based on a frame at time T2.

FIG. 11 is an image view illustrating an image I13, an image I14 and an image I15 generated based on a frame at time T2. The image I13 is an image of a frame at time T2 in a dynamic image indicated by the M number of standard deviation data D6 obtained in step S6. The image I14 is an image of a frame at time T2 in a dynamic image indicated by the M number of standard deviation data D7 obtained in step S7. A difference between the image I13 and the image I14 is an image I15 (surveillance image). All of the images I10 to I15 illustrated in FIGS. 10 and 11 are images in which standard deviation is set to 5000 times.

Since the image I12 illustrated in FIG. 10 is an image captured before a gas is discharged from the point SP1 illustrated in FIG. 4A, the image I12 does not illustrate a scene of a gas coming out from the point SP1. On the contrary, since the image I15 illustrated in FIG. 11 is an image captured at a time when a gas is discharged from the point SP1, the image I15 illustrates a scene of a gas coming out from the point SP1.

As described above, according to the embodiment, the image processing unit 9 (FIG. 1A) performs processing of removing low frequency component data D2 included in dynamic image data MD of these infrared images to generate dynamic image data, and the display control unit 10 causes the display unit 11 to display the dynamic image (dynamic image of surveillance images) indicated by this dynamic image data. Therefore, according to the embodiment, even though a gas leak and background temperature change occur in parallel and background temperature change is larger than temperature change due to the leaked gas, it is possible to display a scene of a gas leaking in a dynamic image of the surveillance image.

Since the sensor noise decreases as the temperature increases, it varies depending on the temperature. In the two-dimensional image sensor 6 (FIG. 1A), a noise corresponding to the temperature sensed by a pixel is generated in each pixel. That is, noises of all pixels are not the same. According to the embodiment, since a high frequency noise is removable from the dynamic image, it is possible to display even a slight gas leak on the display unit 11.

Figure 12:
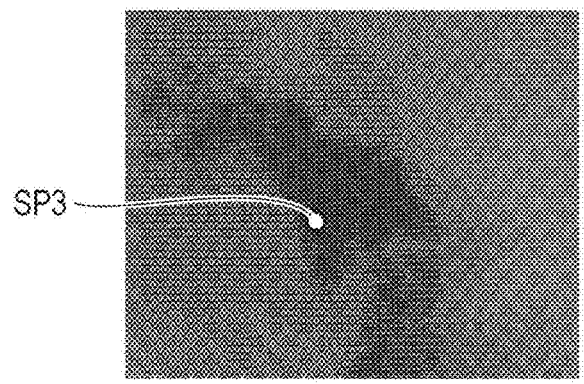
FIG. 12 is an image view illustrating an infrared image in which the sky is photographed in a state where a cloud exists.

Next, false detection of a gas generated due to a dynamic image captured by an infrared camera 2 including an image of a moving cloud will be described. The infrared camera 2 is installed at an angle where the sky is included in the background. In such a case, the image of the moving cloud may be captured at the dynamic image. FIG. 12 is an image view illustrating an infrared image 100 in which the sky is photographed in a state where a cloud exists. Since temperature difference between the cloud and the sky is small, a difference between the image of the cloud and the image of the sky does not appear clearly. There are located a cloud image in the vicinity of the center of the infrared image 100, and an sky image other than the cloud image. One point SP3 corresponds to one pixel of the infrared image 100.

Figure 13:
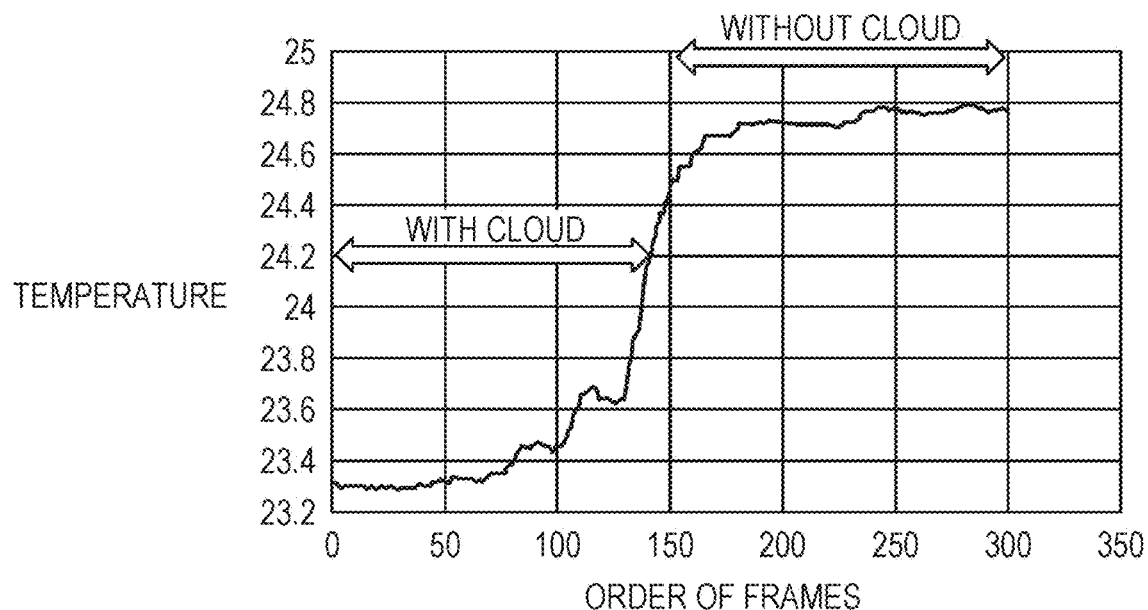
FIG. 13 is a graph illustrating temperature change of a point SP3.

FIG. 13 is a graph illustrating the temperature change of the point SP3. The horizontal and vertical axes of the graph are the same as the horizontal and vertical axes of the graph in FIG. 4A. Since the frame rate is 30 fps, a graph of temperature change for 10 seconds is illustrated. The cloud moves and changes from a state where the cloud is located at the point SP3 to a state where the cloud is not located at the point SP3. A period of change at point SP3 is a period of approximately 100-th to 150-th frames. Temperature change in this period is larger than that temperature change in a period before and after this period.

Figure 14:
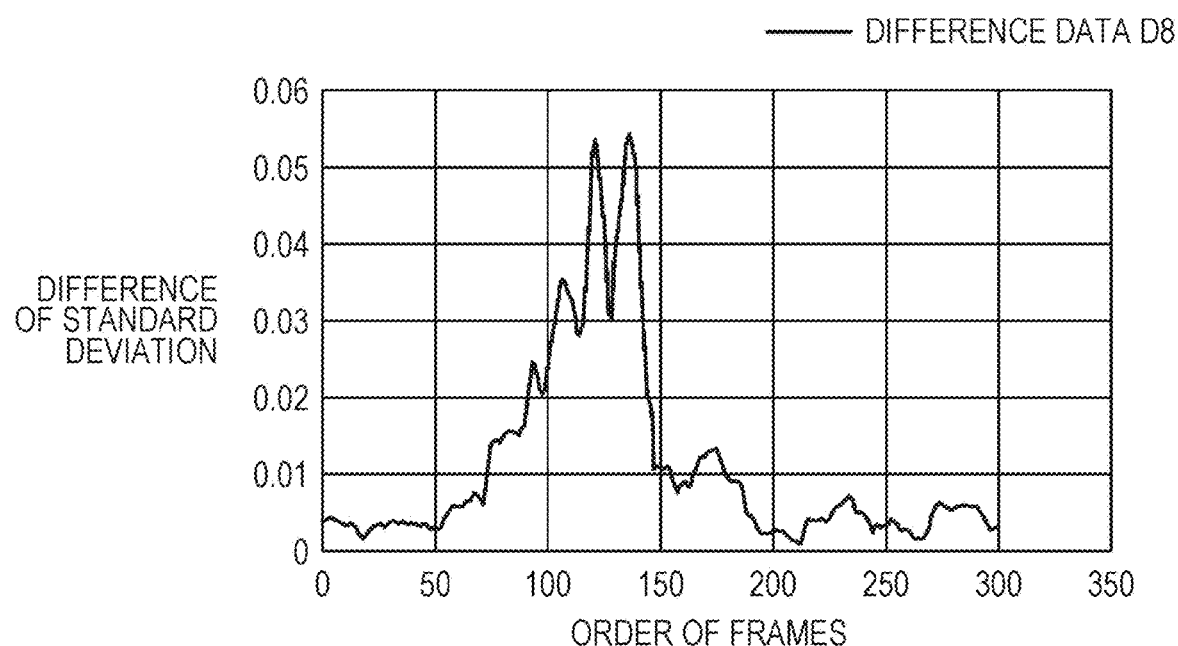
FIG. 14 is a graph illustrating difference data D8 generated based on time series pixel data D1 illustrating temperature change at the point SP3.

FIG. 14 is a graph illustrating difference data D8 generated based on time series pixel data D1 indicating temperature change at point SP3. The horizontal axis of the graph is the same as the horizontal axis of the graph in FIG. 4A. The vertical axis of the graph indicates the difference of the standard deviation. The difference data D8 is generated by performing the processing of steps S2 to S8 illustrated in FIG. 5, on the time series pixel data D1 indicating the temperature change of the point SP3. The difference data D8 becomes larger in the period of the 100-th to 150-th frames. This period is a period of changing from a state where the cloud is located at the point SP3 to a state where the cloud is not located.

With reference to FIG. 9, the difference data D8 in a period during which a gas comes out is larger than difference data D8 in a period during which no gas comes out. The difference data D8 in the period of approximately the 100-th to 150-th frames illustrated in FIG. 14 is as large as difference data D8 in a period during which a gas comes out. Therefore, in a case where the difference data D8 illustrated in FIG. 14 is obtained, there is a possibility that the gas detection-use image processing device 3 performs false detection as a gas. Incidentally, in a case where the cloud does not move, temperature change as described in FIG. 13 does not occur, so that no false detection occurs.

The embodiment is designed to prevent this false detection. FIG. 15 is a flowchart of processing executed in the embodiment.

With reference to FIGS. 1A and 15, the processing unit 91 generates a dynamic image of a surveillance image based on dynamic image data MD (step S100). In detail, it is described that the processing unit 91 performs the processing of steps S1 to S9 illustrated in FIG. 5, on the dynamic image data MD. In this way, each frame configuring the dynamic image changes from an infrared image to a surveillance image, and the dynamic image of the surveillance image is generated. The surveillance image is, for example, the image I12 illustrated in FIG. 10, or the image I15 illustrated in FIG. 11. In a case where a gas candidate has appeared, a region image illustrating a region where a gas candidate has appeared is included in the surveillance image. An image illustrating a region where a gas has appeared may be a region image, and an image illustrating a moving cloud as described above may be a region image. An image I15 is an image after two seconds from the start of gas discharge. A white region located in the vicinity of the center of the image I15 is the region image. Herein, the region image is an image illustrating a region where a gas has appeared.

In the embodiment, although the region image is obtained through the processing of steps S1 to S9, the region image may be obtained using a known technique (for example, image processing disclosed in Patent Literature 1) of obtaining a region image through image processing on an infrared image.

As described above, the processing of step S100 is the processing of extracting a region image from an infrared image. The infrared image subjected to processing of extracting the region image is a surveillance image.

It is considered that a region image is included in each frame (each surveillance image) configuring the dynamic image generated in step S100. The processing unit 91 sets a predetermined region including a region image in each surveillance image to acquire the predetermined region as a first image (step S101). That is, the processing unit 91 sets a predetermined region including the region image in each infrared image subjected to the processing of extracting the region image, to acquire the predetermined region as the first image.

Figure 16:
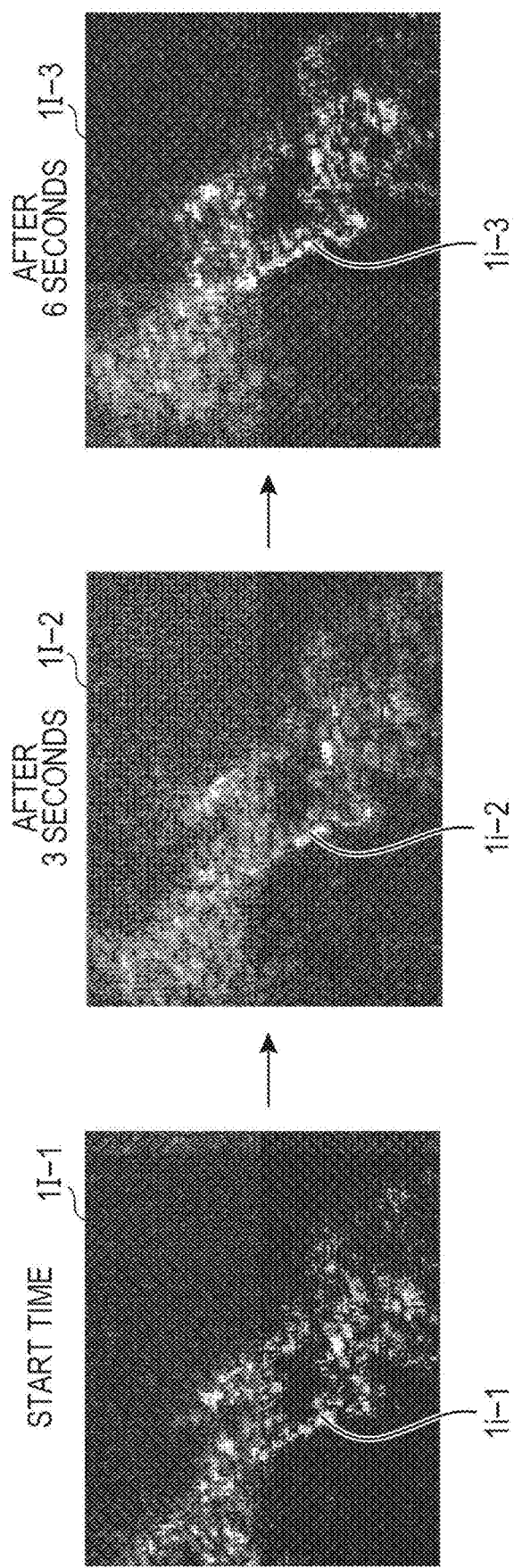
FIG. 16 is an explanatory diagram for describing a first image 1I generated according to the embodiment, in a case where the infrared camera is installed at an angle where the sky is included in the background and an image of a moving cloud is captured.

FIG. 16 is an explanatory diagram for describing the first image 1I generated according to the embodiment, in a case where the infrared camera 2 is installed at an angle where the sky is included in the background and a moving cloud is captured. FIG. 16 illustrates the first image 1I cut out from the surveillance image. The processing unit 91 may automatically cut out the first image 1I from the surveillance image. Alternatively, a user may actually operate the gas detection system 1 to confirm a region where reflection erroneously recognized as a gas occurs and manually cut out the region. In the latter case, the user decides a size of the first image 1I such that the first image 1I includes a first region image 1i. The decided size is stored in advance in the processing unit 91. In the former case, for example, after performing binarization of surveillance images illustrated in FIGS. 10 and 11 (that is, for example, after performing binarization of difference data D8 illustrated in FIG. 9 and difference data D8 illustrated in FIG. 14 with a predetermined threshold value (for example, 0.02)), the processing unit 91 performs labeling processing, and automatically performs cutting out.

The dynamic image generated in step S100 is set to, for example, a dynamic image for 10 seconds. The first image 1I-1 is a first image 1I set as the surveillance image at the start time of the 10 seconds. The first image 1I-2 is a first image 1I set as the surveillance image after 3 seconds from the start time. The first image 1I-3 is a first image 1I set as the surveillance image after 6 seconds from the start time.

The first image 1I is a portion of the surveillance image and has a rectangular shape. The shape of the first image 1I is not limited to the rectangular shape. A value of each pixel configuring the first image 1I is difference of the standard deviation. In the first image 1I, an image configured with pixels other than black pixels is the region image 1i. The region image 1i-1 included in the first image 1I-1, the region image 1i-2 included in the first image 1I-2, and the region image 1i-3 included in the first image 1I-3 are an image illustrating a moving cloud. The region image 1i moves with the elapse of time. This illustrates the movement of the cloud.

As described above, the processing unit 91 uses first processing of acquiring a first image 1I including a region image 1i illustrating a region where a gas candidate has appeared, extracted from a predetermined region of an infrared image, and performs the first processing on each of a plurality of infrared images captured at a plurality of different times to acquire a plurality of the first images 1I.

According to the embodiment, the processing unit 91 performs processing of extracting the region image 1i from each infrared image (step S100), and sets a predetermined region including the region image 1i in each infrared image subjected to this processing to acquire the predetermined region as the first image 1I (step S101). As a modification, the user may set the predetermined region in the infrared image in advance. The modification is applied when a position where a gas is highly likely to appear is known in advance. In detail, it is described that, with reference to FIG. 1A, the display control unit 10 causes the display unit 11 to display a dynamic image (a dynamic image of infrared images) indicated by the dynamic image data MD. The user operates the input unit 12 to set a predetermined region in the infrared image displayed on the display unit 11.

When the input unit 12 is operated to set a predetermined region in the infrared image, the processing unit 91 performs processing of extracting the region image 1i on a predetermined region, instead of performing processing of extracting the region image 1i on the entire infrared image. The processing unit 91 acquires the predetermined region subjected to this processing as the first image 1I.

According to the modification, since the processing of extracting the region image 1i is not performed on the entire infrared image, but is performed on a predetermined region set in the infrared image, it is possible to reduce an amount of image processing.

It returns to the description of the embodiment. The region image 1i may be an image illustrating a region where a gas has appeared, or an image illustrating a moving cloud. In a case where the region image 1i is an image illustrating a moving cloud, the region image 1i is moved when viewed in time series.

The movement of the cloud has a substantially constant speed with almost no change in the shape of the cloud when viewed in a short period of time (for example, about 10 seconds). Therefore, in the case where the region image 1i is an image illustrating a moving cloud, the region image 1i moves at a substantially constant speed with almost no change in its shape, when viewed in a short period of time. Therefore, once the similarity between the two first images 1I is calculated in consideration of the movement of the region image 1i, the similarity becomes relatively high.

On the contrary, in the case where the region image 1i is an image illustrating the region where a gas has appeared, the gas leaks from the same position, so that the region image 1i often does not move when viewed in time series. Since the gas fluctuates irregularly, the similarity between two first images 1I is low, as compared with a case where the region image 1i is an image illustrating a moving cloud.

From the above, when the following conditions of (1) and (2) are satisfied, the region image 1i is highly likely to be not an image illustrating a region where a gas has appeared, but an image illustrating a moving cloud, so that there is a high possibility that the gas candidate is a non-gas.

(1) The region image 1i is moved.

(2) The similarity is relatively high when the similarity between two first images 1I is calculated in consideration of the movement of the region image 1i.

In a case where a direction of the wind does not change significantly during a short period of time described above, the region image 1i has the same property in the movement direction. The same property means that the movement direction of the region image 1i is the same, or substantially the same. For example, in the case where the movement direction of the region image 1i in the period from 0 seconds (start time) to 3 seconds and the movement direction of the region image 1i in the period from 0 seconds to 6 seconds are the same, or substantially the same, the region image 1i has the same property in the movement direction.

Therefore, when the conditions of (1) and (2) are satisfied and the following condition of (3) is satisfied, there is a very high possibility that the region image 1i is an image illustrating a moving cloud.

(3) The region image 1i has the same property in the movement direction.

In the embodiment, when the conditions of (1) to (3) are satisfied, the region image 1i is determined as an image illustrating a moving cloud. This is the processing of steps S102 to S106. The moving cloud has been described as an example, but the same is applicable to a subject that moves at a substantially constant speed with almost no change in its shape. That is, when the conditions of (1) to (3) are satisfied, there is a very high possibility that the region image 1i is an image illustrating the subject. Incidentally, it is also possible not to consider the condition of (3) in an aspect.

Two first images 1I among three first images 1I are combined, and a plurality of sets are preset as an object for calculation of similarity. This may be set by the manufacturer of the gas detection-use image processing device 3 or may be set by a user. In the embodiment, a set configured with the first image 1I-1 and the first image 1I-3, and a set configured with the first image 1I-1 and the first image 1I-2 are an object used for calculating the similarity.

The decision unit 92 acquires a plurality of similarities by calculating similarity between two first images 1I-1 and 1I-3 while changing a positional relationship between two first images 1I-1 and 1I-3 (step S102).

Figure 17:
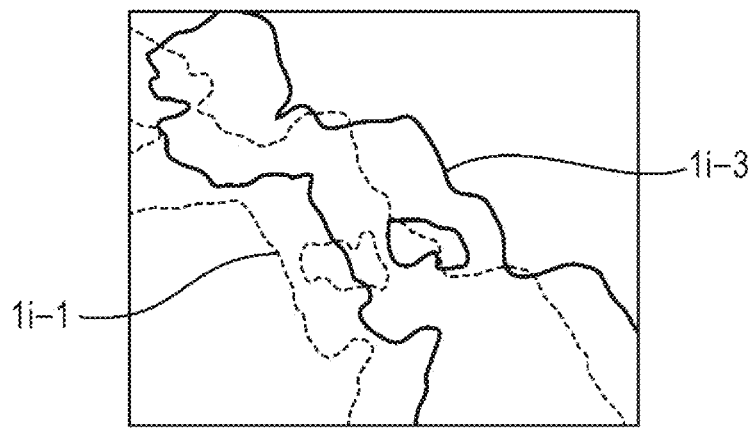
FIG. 17 is a schematic view illustrating a positional relationship between a region image 1$i$-1 and a region image 1$i$-3 when a position of the first image 1I-1 is at a starting point.

The step S102 will be described in detail. At a position where the first image 1I-1 and the first image 1I-3 completely overlap, the center of the first image 1I-1 is set to the starting point (0, 0). FIG. 17 is a schematic view illustrating the positional relationship between the region image 1i-1 and the region image 1i-3 when the position of the first image 1I-1 is at the starting point. The decision unit 92 moves the first image 1I-1 within a predetermined range, and calculates similarity between the rust image 1I-1 and the first image 1I-3 at each of coordinates including the starting point. This is pattern matching processing. The similarity is calculated for a portion where the first image 1I-1 and the first image 1I-3 overlap. The predetermined range is, for example, −20 pixels to +20 pixels in an x-direction, and −20 pixels to +20 pixels in a y-direction. Thus, 1681 similarities (=41 pixels×41 pixels) are calculated.

Although there are various methods of calculating similarity, the decision unit 92 calculates similarity using, for example, Equation 1. Equation 1 indicates Normalized Cross Correlation (NCC).

[Equation 1]

$$\text{Similarity} = \frac{\sum_{j=0}^{N-1}\sum_{i=0}^{M-1} I(i,j)T(i,j)}{\sqrt{\sum_{j=0}^{N-1}\sum_{i=0}^{M-1} I(i,j)^2 \times \sum_{j=0}^{N-1}\sum_{i=0}^{M-1} T(i,j)^2}} \quad \text{(Equation 1)}$$

I(i, j), here, indicates coordinates on the first image 1I-1. T(i, j), here, indicates coordinates on the first image 1I-3. The i indicates a coordinate value in an x-direction. j indicates a coordinate value in a y-direction. M indicates the number of pixels in the x-direction of the first image 1I. N indicates the number of pixels in the y-direction of the first image 1I.

The normalized cross correlation is a value in the range of −1 to +1. In a case where no correlation exists between the first image 1I-1 and the first image 1I-3, the normalized cross correlation is zero. The normalized cross correlation approaches +1 as positive correlation between the first image 1I-1 and the first image 1I-3 becomes stronger. The normalized cross correlation approaches −1 as negative correlation between the first image 1I-1 and the first image 1I-3 becomes stronger. The similarity between the first image 1I-1 and the first image 1I-3 increases as the normalized cross correlation approaches +1.

The decision unit 92 stores the calculated 1681 similarities in association with the coordinates. For example, when the position of the first image 1I-1 is the coordinates (18, −6), the similarity between the first image 1I-1 and the first image 1I-3 is set to 0.86. The decision unit 92 stores the coordinates (18, −6) in association with 0.86.

The decision unit 92 decides maximum similarity among the calculated 1681 similarities (step S103). Here, the maximum similarity is set to 0.86. This similarity is determination-use similarity. The determination-use similarity is similarity used for determining whether or not a gas candidate is a gas, and is similarity between two first images 1I, which has been calculated in consideration of the movement of the region image 1i. Among the 1681 calculated similarities, high similarity is the determination-use similarity. Herein, the maximum similarity is set as the determination-use similarity, but the second-highest similarity or the third-highest similarity may be set as the determination-use similarity.

The decision unit 92 decides coordinates at which the similarity becomes a maximum (that is, the coordinates associated with the maximum similarity) as the position of the region image 1i after 6 seconds. Herein, the coordinates (18, −6) is decided as the position of the region image 1i after 6 seconds. The decision unit 92 decides that the region image 1i is not moved, in a case where the coordinates at which the similarity becomes the maximum is at the starting point, and decides that the region image 1i is moved, in a case where the coordinate is different from the starting point. Herein, since the coordinates at which the similarity becomes the maximum is coordinates (18, −6), the decision unit 92 decides that the region image 1i is moved.

The decision unit 92 decides a direction from the starting point to the coordinates (coordinates at which the similarity becomes the maximum) as the movement direction of the region image 1i (that is, the movement direction of the cloud) (step S104). Herein, the direction from the starting point to the coordinates (18, −6) is decided as the movement direction of the region image 1i. Also, since it is determined that the region image 1i has moved from the starting point to the coordinates (18, −6) in 6 seconds, the moving speed of the region image 1i is also determined.

As described above, the decision unit 92 decides the movement direction of the region image 1i based on two first images 1I, and decides similarity between two first images 1I calculated by the positional relationship of the decided movement direction, as determination-use similarity used for determining whether or not the gas candidate is a gas (steps S102 to S104).

Figure 18:
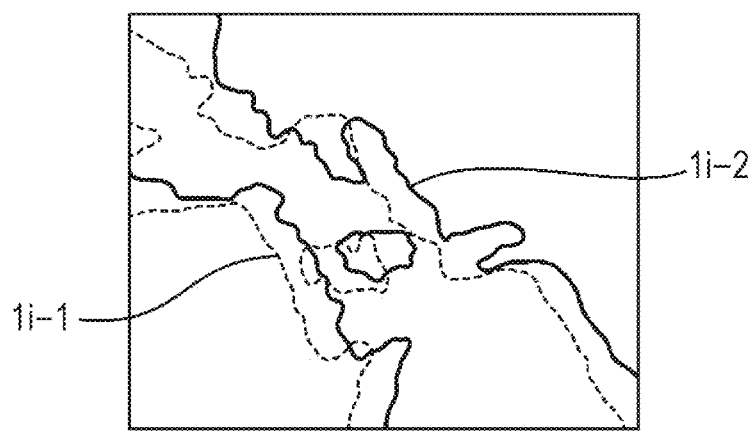
FIG. 18 is a schematic view illustrating a positional relationship between the region image 1$i$-1 and a region image 1$i$-2 when the position of the first image 1I-1 is at the starting point.

The decision unit 92 moves the first image 1I-1 to predetermined coordinates, and calculates the similarity between two first images 1I-1 and 1I-2 (step S105). The step S105 will be described in detail. At a position where the first image 1I-1 and the first image 1I-2 completely overlap, the center of the first image 1I-1 is set to the starting point (0, 0). FIG. 18 is a schematic view illustrating the positional relationship between the region image 1i-1 and the region image 1i-2 when the position of the first image 1I-1 is at the starting point. The decision unit 92 moves the first image 1I-1 to coordinates (9, −3), and calculates similarity between the first image 1I-1 and the first image 1I-2. The similarity is calculated for a portion where the first image 1I-1 and the first image 1I-2 overlap. Herein, the similarity is set to 0.89.

The reason for the coordinates (9, −3) is as follows. The coordinates (18, −6) is the position of the region image 1i after 6 seconds. In a case where the region image 1i is an image illustrating a moving cloud, the region image 1i moves at a substantially constant speed in the same direction. Therefore, it is possible to regard (9, −3) as the position of the region image 1i after 3 seconds.

In this way, the decision unit 92 determines the similarity between the first image 1I-1 and the first image 1I-2 in consideration of the movement of the region image 1i. This similarity is determination-use similarity. In the embodiment, methods of deciding the determination-use similarity are different from a set (the first set) configured with the first image 1I-1 and the first image 1I-3, and a set (the remaining set) configured with the first image 1I-1 and the first image 1I-2. However, it is also possible to determine the determination-use similarity between the first image 1I-1 and the first image 1I-2, according to the same method as that of the determination-use similarity between the first image 1I-1 and the first image 1I-3. In this case, the decision unit 92 performs the processing of steps S102 to S104 on the first image 1I-1 and the first image 1I-2.

The determination unit 93 determines whether or not the region image 1i is an image illustrating a moving cloud (step S106). The step S106 will be described in detail. In a case where the determination-use similarity exceeds a predetermined threshold (for example, 0.80), it is considered that the determination-use similarity is relatively high.

The determination-use similarity determined in step S103 (that is, the similarity between the first image 1I-1 and the first image 1I-3 at the coordinates (18, −6)) is 0.86. The determination unit 93 determines that this similarity is relatively high.

The determination-use similarity (that is, the similarity between the first image 1I-1 and the first image 1I-2 at the coordinates (9, −3)) decided in step S105 is 0.89. The determination unit 93 determines that this similarity is relatively high.

The coordinates at which the determination-use similarity determined in step S103 is obtained are not the starting point, but the coordinates (18, −6). The determination unit 93 determines that the region image 1i is moved.

The movement direction of the region image 1i in the period from 0 seconds (the start time) to 6 seconds is a direction from the starting point to the coordinates (18, −6), and the movement direction of the region image 1i in the period from 0 seconds to 3 seconds is a direction from the starting point to the coordinates (9, −3). The determination unit 93 determines that the region image 1i has the same property in the movement direction.

From the above, the determination unit 93 determines that the region image 1i is not an image illustrating the region where a gas has appeared, but an image illustrating a moving cloud. As a result, the determination unit 93 determines that the gas candidate is a non-gas (step S107). In other words, the determination unit 93 determines the gas candidate as a noise.

In this way, the determination unit 93 determines whether or not the gas candidate is a gas, based on the determination-use similarity, whether or not the region image 1i is moved, and whether or not the region image 1i has the same property in the movement direction.

Figure 19:
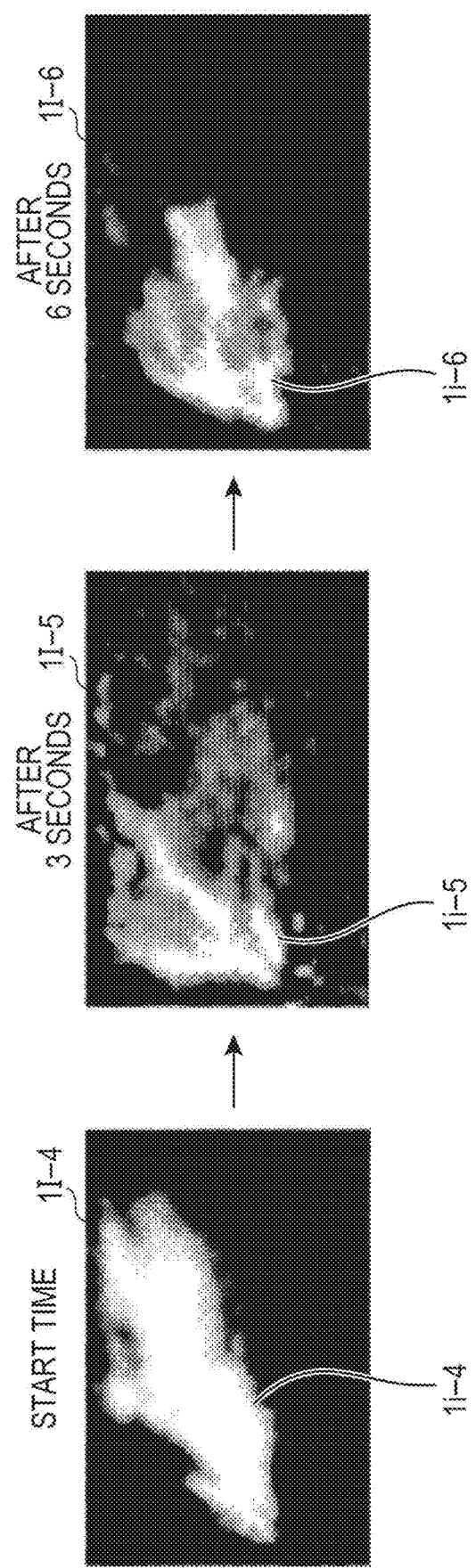
FIG. 19 is an explanatory view for describing the first image 1I generated according to the embodiment in a case where a gas has appeared.

Next, the case where a gas has appeared will be described. FIG. 19 is an explanatory diagram for describing the first image 1I generated according to the embodiment in a case where a gas has appeared. Each first image 1I illustrated in FIG. 19 is a first image 1I acquired from each frame (each surveillance image) configuring a dynamic image for 10 seconds, as in FIG. 16.

The first image 1I-4 is a first image 1I set as the surveillance image at the start time of the 10 seconds. A first image 1I-5 is a first image 1I set as the surveillance image after 3 seconds from the start time. A first image 1I-6 is a first image 1I set as the surveillance image after 6 seconds from the start time. The region image 1i-4 included in the first image 1I-4, the region image 1i-5 included in the first image 1I-5, and the region image 1i-6 included in the first image 1I-6 are an image illustrating a region where a gas has appeared.

Figure 20:
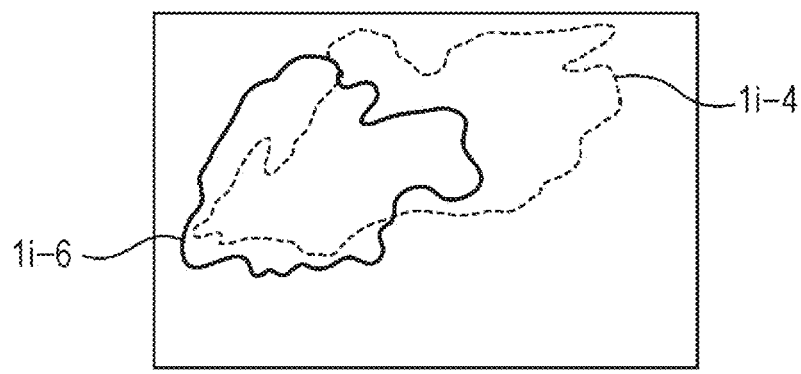
FIG. 20 is a schematic view illustrating a positional relationship between a region image 1i-4 and a region image 1i-6 when a position of the first image 1I-4 is at the starting point.

FIG. 20 is a schematic view illustrating a positional relationship between the region image 1i-4 and the region image 1i-6 when the position of the first image 1I-4 is at the starting point. The decision unit 92 performs the processing of steps S102 to S104 on the first image 1I-4 and the first image 1I-6. Herein, the maximum similarity (the determination-use similarity) is set to 0.74, and the movement direction of the region image 1i is set to a direction from the starting point to coordinates (−6, 2).

Figure 21:
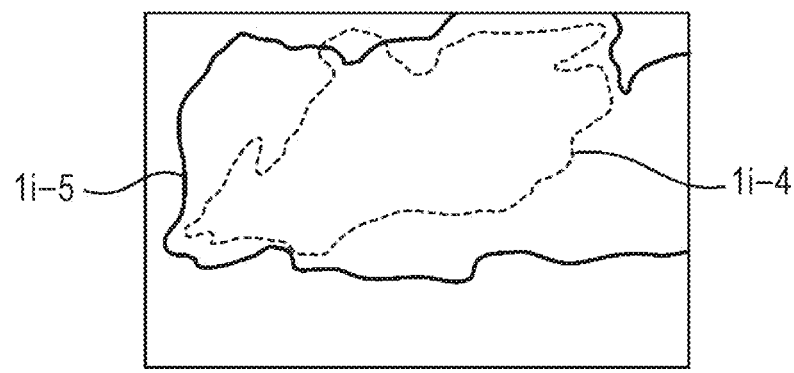
FIG. 21 is a schematic view illustrating a positional relationship between the region image 1i-4 and a region image 1i-5 when the position of the first image 1I-4 is at the starting point.

The decision unit 92 performs the processing of step S105 on the first image 1I-4 and the first image 1I-5. FIG. 21 is a schematic view illustrating a positional relationship between the region image 1i-4 and the region image 1i-5 when the position of the first image 1I-4 is at the starting point. Herein, the decision unit 92 moves the first image 1I-4 to coordinates (−3, 1), and similarity (determination-use similarity) between the first image 1I-4 and the first image 1I-5. The similarity is set to 0.65.

The determination-use similarity (that is, the similarity between the first image 1I-4 and the first image 1I-6 at the coordinates (−6, 2)) decided in step S103 is set to 0.74. The determination unit 93 determines that this similarity is not relatively high.

The determination-use similarity decided in step S105 (that is, the similarity between the first image 1I-4 and the first image 1I-5 at the coordinate (−3, 1)) is 0.65. The determination unit 93 determines that this similarity is not relatively high.

From the above, the determination unit 93 determines that the region image 1i is not an image illustrating a moving cloud, but an image illustrating a region where a gas has appeared. As a result, the determination unit 93 determines that the gas candidate is a gas (step S107).

Incidentally, in the embodiment, the similarity is calculated using Equation 1. The calculation of the similarity is not limited to Equation 1. For example, Equation 2 may be used for calculating the similarity. Equation 2 indicates Zero-mean Normalized Cross Correlation (ZNCC).

[Equation 2]

$$\text{Similarity} = \frac{\sum_{j=0}^{N-1}\sum_{i=0}^{M-1}((I(i,j)-\bar{I})(T(i,j)-\bar{T}))}{\sqrt{\sum_{j=0}^{N-1}\sum_{i=0}^{M-1}(I(i,j)-\bar{I})^2 \times \sum_{j=0}^{N-1}\sum_{i=0}^{M-1}(T(i,j)-\bar{T})^2}} \quad \text{(Equation 2)}$$

In the embodiment, although, among three first images 1I, the processing of steps S102 to S104 may be performed on a set configured with 1st first images 1I (first images 1I-1 and 1I-4) and 3rd first images 1I (first images 1I-3 and 1I-6), and the processing of step S105 may be performed on a set configured with 1st first images 1I and 2nd first images 1I (first images 1I-2 and 1I-5), or vice versa.

In the embodiment, among three first images 1I, a set configured with 1st first images 1I and 3rd first images 1I, and a set configured with 1st first images 1I and 2nd first images 1I are an object used for calculating the similarity. However, this combination is optional. For example, a set configured with 1st first images 1I and 2nd first images 1I, and a set configured with 2nd first images 1I and 3rd first images 1I may be an object used for calculating the similarity. Also, the number of combinations is not limited to two, and may be one or three.

In the embodiment, although three first images 1I are used, the number of first images 1I is not limited to three, but may be two, or may be four or more. In a case where the number of first images 1I is four or more, the number of combinations may be four or more.

In the embodiment, the time of capturing an infrared image from which 1st first images 1I are extracted is set as the start time, the time of capturing an infrared image from which 2nd first images 1I are extracted is after 3 seconds, and the time of capturing an infrared image from which 3rd first images 1I are extracted is after 6 seconds. However, it is not limited to this as long as it is within the aforementioned short period of time (about 10 seconds). For example, the time of capturing the infrared image from which 2nd first images 1I are extracted may be after 4 seconds, and the time of capturing the infrared image from which 3rd first images 1I are extracted may be after 8 seconds.

Integration of the Embodiment

A gas detection-use image processing device according to a first aspect of the embodiment includes: a processing unit performs first processing of acquiring a first image including a region image illustrating a region where a gas candidate has appeared, extracted from a predetermined region of an infrared image, on each of a plurality of the infrared images captured at a plurality of different times to acquire a plurality of the first images; a decision unit that decides a movement direction of the region image based on two of the first images, and decides similarity between the two first images, in consideration of the region image moving to the decided movement direction; and a determination unit that determines whether or not the gas candidate is a gas, based on the similarity decided by the decision unit and whether or not the region image is moved.

The region image occurs in the aforementioned case where (the case where a camera for capturing an infrared image is installed at an angle where the sky is included in the background and a moving cloud is captured) other than a case where a gas has appeared.

There is a possibility that the region image is an image illustrating a region where a gas has appeared, or the region image is an image illustrating a moving cloud. In the case where the region image is an image illustrating a moving cloud, the region image is moved when viewed in time series.

The movement of the cloud, when viewed from a short period (for example, about 10 seconds), has almost no change in the shape of the cloud when observed from the ground, and has a substantially constant speed. Therefore, in the case where the region image is an image illustrating a moving cloud, the region image moves at a substantially constant speed with almost no change in its shape, when viewed in a short period of time. Therefore, once similarity between two first images is calculated in consideration of the movement of the region image, the similarity becomes relatively high. Incidentally, although a cloud which does not move is also captured as an infrared image, since the cloud does not produce temperature change, the cloud is not falsely detected as a gas.

On the contrary, in the case where the region image is an image illustrating a region where a gas leaking from a predetermined place such as piping has appeared, the gas leaks from the same position, so that the region image often does not move when viewed in time series. Since the gas fluctuates irregularly, the similarity between two first images is low, as compared with the case where the region image is an image illustrating a moving cloud.

From the above, when the following conditions of (1) and (2) are satisfied, since there is a high possibility that the region image is not an image illustrating a region where a gas has appeared, but an image illustrating a moving cloud, there is a high possibility that the gas candidate is a non-gas.

(1) The region image is moved.

(2) When the similarity between two first images is calculated in consideration of the movement of the region image, the similarity is relatively high.

The decision unit decides the movement direction of the region image based on two of the first images, and decides similarity between the two first images, in consideration of the region image moving to the decided movement direction. The decided similarity becomes the determination-use similarity used for determining whether or not the gas candidate is a gas. Preferably, the decision unit acquires a plurality of similarities by calculating the similarity of two first images while changing a positional relationship between two first images, and decides determination-use similarity among the plurality of similarities. Among the plurality of similarities, a high similarity is the determination-use similarity. For example, the decision unit decides the maximum similarity among the plurality of similarities as the determination-use similarity. For example, the decided determination-use similarity is not limited to the maximum similarity, but may be the second-highest similarity or the third-highest similarity.

The decision unit calculates the similarity using, for example, the normalized cross correlation or the zero mean normalized cross correlation.

The determination unit determines whether or not the gas candidate is a gas, based on the decided similarity (that is, determination-use similarity) and whether or not the region image is moved. For example, in a case where the determination-use similarity is relatively high and the region image is moved, the determination unit regards the region image as an image illustrating a moving cloud, and determines that the gas candidate is a non-gas. For example, when the determination-use similarity exceeds a predetermined threshold, the determination unit determines that the determination-use similarity is relatively high.

The moving cloud has been described as an example, but the same is applicable to a subject that moves at a substantially constant speed with almost no change in its shape. &As described above, according to the gas detection-use image processing device in the first aspect of embodiment, it is possible to improve the accuracy of gas detection.

The number of plurality of first images may be two, or three or more. In a case where the number of first images is three or more, it is possible to determine that the movement direction of the region image has the same property as described later.

In the configuration, the processing unit performs the first processing on each of three or more of the infrared images captured at three or more different times to acquire three or more of the first images, and the determination unit adds whether or not the movement direction of the region image has the same property in each of a plurality of sets configured by combining two of the first images among the three or more first images, to a condition for determining whether or not the gas candidate is a gas.

In the case where a direction of the wind does not change significantly during a short period of time described above, the movement direction of the region image has the same property. The same property means that the movement direction of the region image is the same, or substantially the same. For example, when the movement direction of the region image in the period of 0 seconds to 3 seconds and the movement direction of the region image in the period of 0 seconds to 6 seconds are the same or substantially the same, the movement direction of the region image has the same property.

In a case where the decided similarity (determination-use similarity) is relatively high, and the region image is moved, and the movement direction of the region image has the same property, there is a very high possibility that the region image is an image illustrating a moving cloud. In this regard, for example, in a case where the determination-use similarity is relatively high, and the region image is moved, and the movement direction of the region image has the same property, the determination unit determines that a gas candidate is a non-gas. Since the determination unit adds the same property of the movement direction of the region image, to a condition for determining whether or not the gas candidate is a gas, it is possible to further improve the accuracy of gas detection. Incidentally, for example, when the determination-use similarity exceeds a predetermined threshold, the determination unit determines that the determination-use similarity is relatively high.

In the configuration, the determination unit adds the similarity (determination-use similarity) in each of the plurality of sets, to a condition for determining whether or not the gas candidate is a gas.

In a case where the determination-use similarity in each of the plurality of sets is relatively high, there is a high possibility that the region image is an image illustrating a moving cloud, as compared with a case where the determination-use similarity in any one or more of the plurality of sets is not relatively high. For example, in a case where determination-use similarity in each of the plurality of sets is relatively high, and the region image is moved, and the movement direction of the region image has the same property, the determination unit determines that a gas candidate is a non-gas. Since the determination unit adds determination-use similarity in each of the plurality of sets, to a condition for determining whether or not the gas candidate is a gas, it is possible to further improve the accuracy of gas detection.

A method of determining determination-use similarity in each of the plurality of sets will be described. The decision unit divides the plurality of sets into a first set that is one set, and the remaining sets. The remaining sets may be one, or may be two or more. The decision unit decides a movement direction of a region image in the first set based on two first images configuring the first set, and decides similarity (similarity between two first images configuring the first set) calculated by the positional relationship in the decided movement direction, as determination-use similarity in the first set. The decision unit decides the movement direction of the region image in the first set, as the movement direction of the region image in the remaining set, and decides similarity (similarity between two first images configuring the remaining set) calculated by the positional relationship in the decided movement direction, as the determination-use similarity in the remaining set. Incidentally, the decision unit may decide determination-use similarity in the remaining set, in the same manner as the determination-use similarity in the first set. For example, in the second set, it is described that the decision unit decides the movement direction of the region image in the second set based on two first images configuring the second set, and decides similarity (similarity between two first images configuring the second set) calculated in the positional relationship in the decided movement direction, as the determination-use similarity in the second set.

In the configuration, the processing unit performs extraction processing of extracting the region image on the infrared image, and sets the predetermined region including the region image in the infrared image subjected to the extraction processing to acquire the predetermined region as the first image.

In this configuration, the processing of extracting a region image (that is, an image illustrating a region where a gas candidate has appeared) is performed on the entire infrared image. The method of extracting the region image is not limited thereto, and the processing of extracting the region image may be performed on a part of the infrared image. This is indicated as below.

In the configuration, there is further provided an input unit, and when the input unit is operated to set the predetermined region in the infrared image, the processing unit performs extraction processing of extracting the region image on the predetermined region to acquire the predetermined region subjected to the extraction processing as the first image.

This configuration is applied when a position where a gas is highly likely to appear is known in advance. According to this configuration, since the processing of extracting the region image is not performed on the entire infrared image, but is performed on a predetermined region set in the infrared image, it is possible to reduce an amount of image processing.

The gas detection-use image processing method according to a second aspect of the embodiment includes: a processing step of performing first processing of acquiring a first image including a region image illustrating a region where a gas candidate has appeared, extracted from a predetermined region of an infrared image, on each of a plurality of the infrared images captured at a plurality of different times to acquire a plurality of the first images; a decision step of deciding a movement direction of the region image based on two of the first images, and deciding similarity between the two first images, in consideration of the region image moving to the decided movement direction; and a determination step of determining whether or not the gas candidate is a gas, based on the similarity decided in the decision step and whether or not the region image is moved.

In the gas detection-use image processing method according to the second aspect of the embodiment, the gas detection-use image processing device according to the first aspect of the embodiment is defined from the viewpoint of a method, and the same effects as those of the gas detection-use image processing device according to the first aspect of the embodiment are obtained.

A gas detection image processing program according to a third aspect of the embodiment causes a computer to execute: a processing step of performing first processing of acquiring a first image including a region image illustrating a region where a gas candidate has appeared, extracted from a predetermined region of an infrared image, on each of a plurality of the infrared images captured at a plurality of different times to acquire a plurality of the first images; a decision step of deciding a movement direction of the region image based on two of the first images, and deciding similarity between the two first images, in consideration of the region image moving to the decided movement direction; and a determination step of determining whether or not the gas candidate is a gas, based on the similarity decided in the decision step and whether or not the region image is moved.

In the gas detection-use image processing program according to the third aspect of the embodiment, the gas detection-use image processing device according to the first aspect of the embodiment is defined from the viewpoint of a program, and the same effects as those of the gas detection-use image processing device according to the first aspect of the embodiment are obtained.

Although embodiments of the present invention have been illustrated and described in detail, these are merely an illustration and example and not limited thereto. The scope of the present invention should be interpreted by the terms of the accompanying claims.

There is disclosed Japanese Patent Application No. 2016-252270 filed on Dec. 27, 2016, including the specification, claims, drawings and abstract, the entire of which is incorporated herein by reference in its entirety.

INDUSTRIAL APPLICABILITY

According to the present invention, it is possible to provide a gas detection-use image processing device, a gas detection-use image processing method, and a gas detection-use image processing program.

The invention claimed is:

1. A gas detection-use image processing device comprising:
a memory; and
a processor which executes a program stored in the memory to perform operations comprising:
performing first processing to acquire a plurality of first images each including a region image in which a gas candidate appears, wherein the first processing comprises extracting the plurality of first images from a plurality of infrared images captured at a plurality of different times, wherein the plurality of infrared images are captured in a single infrared wavelength region;
performing movement determination processing which comprises determining whether there is movement of the region image between two of the first images, and determining a movement direction of any determined movement of the region image between the two first images;
performing similarity determination processing which comprises determining a similarity between the two first images, in consideration of any determined movement of the region image in the two first images and the movement direction of any determined movement; and
determining whether the gas candidate is a gas, based on results of the movement determination processing and the similarity determination processing.

2. The gas detection-use image processing device according to claim 1, wherein determining whether the gas candidate is a gas comprises determining that the gas candidate is a gas in a case in which the determined similarity is higher than a threshold and it has been determined that there is movement of the region image between the first two images.

3. The gas detection-use image processing device according to claim 1, wherein:
the first processing is performed to acquire at least three of the first images from at least three infrared images captured at at least three different times, and
the movement determination processing comprises (i) determining whether there is movement of the region image between two first images, in each of a plurality of different sets of two first images among the at least three first images, and (ii) determining whether or not a movement direction of the region image has the same property in each of the plurality of different sets of two first images among the at least three first images.

4. The gas detection-use image processing device according to claim 3, wherein the similarity determination processing comprises determining the similarity in each of the plurality of sets.

5. The gas detection-use image processing device according to claim 1, wherein the first processing comprises, for each of the plurality of infrared images, extracting the region image from the infrared image, setting a predetermined region including the region image in the infrared image, and acquiring the predetermined region as one of the first images.

6. The gas detection-use image processing device according to claim 1, wherein the operations performed by the processor further comprise receiving an input to set a predetermined region in the plurality of infrared images; and
wherein the first processing comprises, for each of the plurality of infrared images, extracting the region image from the predetermined region and acquiring the predetermined region as one of the first images.

7. The gas detection-use image processing device according to claim 1, wherein the similarity is calculated using normalized cross correlation or zero mean normalized cross correlation.

8. A gas detection-use image processing method comprising:
performing first processing to acquire a plurality of first images each including a region image in which a gas candidate appears, wherein the first processing comprises extracting the plurality of first images from a plurality of infrared images captured at a plurality of different times, wherein the plurality of infrared images are captured in a single infrared wavelength region;
performing movement determination processing which comprises determining whether there is movement of the region image between two of the first images, and determining a movement direction of any determined movement of the region image between the two first images;
performing similarity determination processing which comprises determining a similarity between the two first images, in consideration of any determined movement of the region image in the two first images and the movement direction of any determined movement; and
determining whether the gas candidate is a gas, based on results of the movement determination processing and the similarity determination processing.

9. A non-transitory recording medium storing a computer readable gas detection-use image processing program that causes a computer to execute functions comprising:
performing first processing to acquire a plurality of first images each including a region image in which a gas candidate appears, wherein the first processing comprises extracting the plurality of first images from a plurality of infrared images captured at a plurality of different times, wherein the plurality of infrared images are captured in a single infrared wavelength region;
performing movement determination processing which comprises determining whether there is movement of the region image between two of the first images, and determining a movement direction of any determined movement of the region image between the two first images;
performing similarity determination processing which comprises determining a similarity between the two first images, in consideration of any determined movement of the region image in the two first images and the movement direction of any determined movement; and
determining whether the gas candidate is a gas, based on results of the movement determination processing and the similarity determination processing.

10. The gas detection-use image processing device according to claim 2, wherein:
the first processing is performed to acquire at least three of the first images from at least three infrared images captured at at least three different times, and
the movement determination processing comprises (i) determining whether there is movement of the region image between two first images, in each of a plurality of different sets of two first images among the at least three first images, and (ii) determining whether or not a movement direction of the region image has the same property in each of the plurality of different sets of two first images among the at least three first images.

11. The gas detection-use image processing device according to claim 2, wherein the first processing comprises, for each of the plurality of infrared images, extracting the region image from the infrared image, setting a predetermined region including the region image in the infrared image, and acquiring the predetermined region as one of the first images.

12. The gas detection-use image processing device according to claim 2, wherein the operations performed by the processor further comprise receiving an input to set a predetermined region in the plurality of infrared images; and
wherein the first processing comprises, for each of the plurality of infrared images, extracting the region image from the predetermined region and acquiring the predetermined region as one of the first images.

13. The gas detection-use image processing device according to claim 2, wherein the similarity is calculated using normalized cross correlation or zero mean normalized cross correlation.

14. The gas detection-use image processing device according to claim 3, wherein the first processing comprises, for each of the plurality of infrared images, extracting the region image from the infrared image, setting a predetermined region including the region image in the infrared image, and acquiring the predetermined region as one of the first images.

15. The gas detection-use image processing device according to claim 3, wherein the operations performed by the processor further comprise receiving an input to set a predetermined region in the plurality of infrared images; and
wherein the first processing comprises, for each of the plurality of infrared images, extracting the region image from the predetermined region and acquiring the predetermined region as one of the first images.

16. The gas detection-use image processing device according to claim 3, wherein the similarity is calculated using normalized cross correlation or zero mean normalized cross correlation.

17. The gas detection-use image processing device according to claim 4, wherein the first processing comprises, for each of the plurality of infrared images, extracting the region image from the infrared image, setting a predetermined region including the region image in the infrared image, and acquiring the predetermined region as one of the first images.

18. The gas detection-use image processing device according to claim 4, wherein the operations performed by the processor further comprise receiving an input to set a predetermined region in the plurality of infrared images; and
wherein the first processing comprises, for each of the plurality of infrared images, extracting the region image from the predetermined region and acquiring the predetermined region as one of the first images.

19. The gas detection-use image processing device according to claim 4, wherein the similarity is calculated using normalized cross correlation or zero mean normalized cross correlation.

20. The gas detection-use image processing device according to claim 5, wherein the similarity is calculated using normalized cross correlation or zero mean normalized cross correlation.

21. A gas detection-use image processing device comprising:
a memory; and
a processor which executes a program stored in the memory to perform operations comprising:
performing first processing to acquire at least three first images each including a region image in which a gas candidate appears, wherein the first processing comprises extracting the at least three first images from at least three infrared images captured at a plurality of different times;
performing movement determination processing which comprises (i) determining whether there is movement of the region image between two first images, in each of a plurality of different sets of two first images among the at least three first images, and (ii) determining whether or not a movement direction of the region image has the same property in each of the plurality of different sets of two first images among the at least three first images;
performing similarity determination processing which comprises determining a similarity between two first images, in consideration of any movement of the region image in the two first images, in each of the plurality of different sets of two first images among the at least three first images; and
determining whether the gas candidate is a gas, based on results of the movement determination processing and the similarity determination processing.

* * * * *